US006035177A

United States Patent [19]

Moses et al.

[11] Patent Number: 6,035,177

[45] Date of Patent: Mar. 7, 2000

[54] SIMULTANEOUS TRANSMISSION OF ANCILLARY AND AUDIO SIGNALS BY MEANS OF PERCEPTUAL CODING

[75] Inventors: Donald Wadia Moses, Eagan, Minn.; Daozheng Lu, Dunedin, Fla.

[73] Assignees: Donald W. Moses, Eagan, Fla.; Nielsen Media Research, Dunedin, Fla.

[21] Appl. No.: 08/607,097

[22] Filed: Feb. 26, 1996

[51] Int. Cl.[7] .............................. H04N 7/00; H04N 7/10

[52] U.S. Cl. ......................... 455/2; 348/1; 348/2; 348/6; 348/12; 455/3.1; 455/6.1; 380/19; 375/200

[58] Field of Search ................................ 348/1, 2, 6, 12; 455/2, 3.1, 6.1; 380/19; 375/200, 202

[56] References Cited

U.S. PATENT DOCUMENTS

| | | | |
|---|---|---|---|
| 3,684,838 | 8/1972 | Kahn | 179/15.55 R |
| 3,696,298 | 10/1972 | Kahn et al. | 325/59 |
| 3,735,048 | 5/1973 | Tomsa et al. | 179/15 |
| 3,885,217 | 5/1975 | Clintron | 325/26 |
| 4,379,947 | 4/1983 | Warner | 179/1 |
| 4,425,642 | 1/1984 | Moses et al. | 370/76 |
| 4,425,661 | 1/1984 | Moses et al. | 375/1 |
| 4,429,404 | 1/1984 | Mai | 375/76 |
| 4,581,746 | 4/1986 | Arnold | 375/5 |
| 4,672,605 | 6/1987 | Hustig et al. | 370/76 |
| 4,688,255 | 8/1987 | Kahn | 381/2 |
| 4,972,471 | 11/1990 | Gross et al. | 380/3 |
| 5,079,647 | 1/1992 | Nenezu et al. | 360/27 |
| 5,213,337 | 5/1993 | Sherman | 455/2 |
| 5,285,498 | 2/1994 | Johnston | 381/2 |
| 5,457,807 | 10/1995 | Weinblatt | 348/1 |
| 5,473,631 | 12/1995 | Moses | 375/202 |
| 5,581,800 | 12/1996 | Fardeau et al. | 455/2 |
| 5,630,203 | 5/1997 | Weinblatt | 348/1 |
| 5,680,179 | 10/1997 | D'Alto et al. | 348/607 |
| 5,754,661 | 5/1998 | Weinfurtner | 381/68.2 |
| 5,764,763 | 6/1998 | Jensen et al. | 348/1 |

FOREIGN PATENT DOCUMENTS

| | | |
|---|---|---|
| 0658984A | 6/1995 | European Pat. Off. . |
| 2260246 | 4/1993 | United Kingdom . |
| PCT/US93/11090 | 5/1994 | WIPO . |
| WO 94/11989 | 5/1994 | WIPO . |

OTHER PUBLICATIONS

Rundfunktech Nische Mitteilungen, vol. 38, No. 3, Jun. 1, 1994, pp. 92–103, Schultze K: Equipment for the Automatic Electronic Registration of "Airplays" and Commercial Spots.

*Primary Examiner*—John K. Peng
*Assistant Examiner*—Linus H. Lo
*Attorney, Agent, or Firm*—Haynes & Boone, L.L.P.

[57] ABSTRACT

A communication system for simultaneously transmitting ancillary codes and audio signals via a conventional audio communications channel using perceptual coding techniques is disclosed. An encoder monitors an audio channel to detect "opportunities" to insert an ancillary code such that the inserted signals are masked by the audio signal, as defined by the "perceptual entropy envelope" of the audio signal. An ancillary code containing, for example, an ID or serial number, is encoded as one or more whitened spread spectrum signals and/or a narrowband FSK ancillary code and transmitted at a time, frequency and/or level such that the data signal is masked by the audio signal. A decoder at a receiving location recovers the encoded ID or serial number.

25 Claims, 14 Drawing Sheets

SIMULTANEOUS TRANSMISSION OF ANCILLARY AND AUDIO SIGNALS BY MEANS OF PERCEPTUAL CODING

TECHNICAL FIELD

The invention relates generally to data communications systems and, more specifically, to a system for enabling the simultaneous transmission of ancillary and audio signals using perceptual coding techniques.

BACKGROUND OF THE INVENTION

It is often desirable to transmit low to medium speed data signals over audio channels, such as telephone, radio and television channels, carrying analog voice and/or music signals. Such data signals may be used to convey, for example, a serial number, the name of a song being played, copyright information, royalty billing codes and virtual reality cues. Such data signals also may be used to identify particular programs and/or program sources. Programs may include television programs, radio programs, laser video disks, tapes, interactive programs and/or games, and or the like; program sources may include program originators, networks, local stations, syndicators, cable companies, and/or the like; and the broadcast of such programs may include the transmission of programs over the air, over a cable, via a satellite, within a household, within a VCR, a disc player, a computer and/or the like.

Such data signals are referred to herein as ancillary codes. When ancillary codes are used to identify programs and/or program sources, these ancillary codes may be detected by program monitoring systems in order to verify the broadcasts of selected programs, by audience metering systems in order to meter the viewing habits of an audience and/or by like systems.

In a program monitoring system that responds to ancillary codes in the program, the ancillary codes, which are inserted into the program signals, are in the form of identification codes that identify the corresponding broadcast programs. When monitoring the broadcast of programs, therefore, the program monitoring system senses the identification codes in order to verify that the encoded programs are broadcast. The program monitoring system also usually determines the geographical regions in which these programs are broadcast, the times at which these programs are broadcast, and the stations, cables and channels over which these programs are broadcast.

In an audience metering system that employs ancillary codes, an ancillary code is typically added to the possible channels to which a receiver may be tuned. When the ancillary code appears at the output of the receiver, the channel tuned by the receiver, as well as program identification codes, if any, are identified. it should be apparent that a unique ancillary code may be added by a program source to some or all of the programs broadcast to households.

When an ancillary code is added to a program signal, it must be done in such a way that the ancillary code is imperceptible to the audience of the program. A variety of techniques have been employed in attempts to attain this imperceptibility.

One popular technique for adding data to an audio channel involves the transmission of data in the under-utilized portions of the frequency spectrum below and/or above the voice band available on a telephone line, such that the data is imperceptible to listeners. Spread spectrum whitening techniques are applied to the data to maintain interference at a low level.

An example of a technique that places the information in the lower frequency region of the voice band is disclosed in U.S. Pat. No. 4,425,661 to Moses et al. Another technique, described in U.S. Pat. No. 4,672,605 to Hustig et al., involves the use of a spread spectrum signal having most of its energy in the higher audio frequency region and above the voice band. Yet another technique, described in U.S. Pat. No. 4,425,642 to Moses et al., involves spread spectrum processing a data throughout the channel spectrum, such that the spectral energy of the data possesses a pseudo random noise characteristic which, when added to the voice channel, causes only an imperceptible increase in white noise.

Although systems such as those described above are typically sufficient for the particular purposes for which they were designed, they suffer certain deficiencies inherent to the use of spread spectrum processing. Specifically, the use of spread spectrum whitening techniques alone results in extremely low data throughput rates on an audio channel, due to the large spreading gain that must be achieved. In addition, although such techniques make limited use of certain "masking" characteristics of the audio signal with which the data is to be transmitted, they do not make full use of such characteristics, as further described below, thereby limiting the processing gain which might otherwise be achieved.

Other techniques for enabling the simultaneous transmission of audio and data in a single channel include (i) using a start pulse created by taking a subband to zero energy level, and then using the following short period of digitized audio as the serial number, and (ii) using subbands to carry a digital message by forcing the subband energy to zero or leaving it at the actual level in order to create "marks" and "spaces" (i.e., "ones" and "zeros"). The primary deficiencies of the former technique include poor noise immunity and the fact that it is not practical in situations in which many bytes of data must be stored and processed. The primary deficiencies of the latter technique also include poor noise immunity, as well as an extremely slow data throughput rate.

Thomas et al., in U.S. Pat. No. 5,425,100, discloses a multi-level encoding system including a plurality of encoders, each associated with a different level in a multi-level broadcast signal distribution system. The disclosure of Thomas et al., in U.S. Pat. No. 5,425,100, is herein incorporated by reference in its entirety.

The commonly used "AMOL" system taught by Haselwood et al., in U.S. Pat. No. 4,025,851, hereby incorporated by reference in its entirety, adds an ancillary data signal, in the form of a source identification code, to selected horizontal lines in the vertical banking interval of a broadcast television signal. Monitoring equipment, which is located in selected regions throughout the United States, verifies that the programs are broadcast by detecting the source identification codes. The monitoring equipment stores, for later retrieval, these detected source identification codes together with the times at which they were detected and the channels on which they were detected.

U.S. Pat. No. 5,243,423, to DeJean et al., hereby incorporated by reference in its entirety, teaches an audience measurement and program monitoring system in which an ancillary signal is transmitted over video lines of the raster of a broadcast television signal. In order to reduce the perceptibility of the ancillary signal, the video lines over which the ancillary signal is transmitted are varied in a pseudo-random sequence. Alternatively, the ancillary signal may be modulated at relatively low modulation levels by converting the ancillary signal to a spread spectrum ancillary signal. The encoded broadcast program is then identified by decoding the ancillary code near a monitored receiver.

The application of digital data compression methodologies to signals has a substantial impact on the usefulness of the encoding methods discussed above. For example, some video compression schemes delete the vertical blanking interval. Accordingly, any ancillary codes injected into the vertical blanking interval may be removed by such compression of the video signals. Digitization may also act to remove spread spectrum ancillary codes and other signals relying on low signal amplitudes for their concealment. Additionally, ancillary codes transmitted in a high frequency portion of a video signal band may be deleted by compression algorithms that "clip" the upper frequencies.

Although adding an ancillary code to the normally visible portion of the active video signal permits the ancillary code to avoid removal by compression schemes in most cases, and although adding the ancillary code at a frequency in the low energy density portion of the video signal increases the likelihood that the ancillary code will be imperceptible even though the ancillary code is added to the active video, under certain conditions the ancillary code may still be perceptible. For example, if the intensity of the luminance that is modulated onto the video (i.e., luminance) carrier, or the intensity of the color that is modulated onto the chrominance subcarrier, is smaller than the ancillary code at the time the ancillary code is modulated onto a frequency between the video carrier and the chrominance subcarrier, the ancillary code will not be masked by the video carrier or the chrominance subcarrier of the video signal. Thus, the ancillary code may have sufficient relative amplitude to be perceived as noise by the audience of the program.

It is known in the art that every audio signal generates a perceptual concealment function which masks audio distortions existing simultaneously with the signal. Accordingly, any distortion, or noise, introduced into the transmission channel if properly distributed or shaped, will be masked by the audio signal itself. Such masking may be partial or complete, leading either to increased quality compared to a system without noise shaping, or to near-perfect signal quality that is equivalent to a signal without noise. In either case, such "masking" occurs as a result of the inability of the human perceptual mechanism to distinguish between two signal components, one belonging to the audio signal and the other belonging to the noise, in the same spectral, temporal or spatial locality. An important effect of this limitation is that the perceptibility of the noise by a listener can be zero, even if the signal-to-noise ratio is at a measurable level. Ideally, the noise level at all points in the audio signal space is exactly at the level of just-noticeable distortion, which limit is typically referred to as the "perceptual entropy envelope."

Hence, the main goal of noise shaping is to minimize the perceptibility of distortions by advantageously shaping it in time or frequency so that as many of its components as possible are masked by the audio signal itself. See Nikil Jayant et al., *Signal Compression Based on Models of Human Perception,* 81 Proc. of the IEEE 1385 (1993). A schematic representation of time-frequency domain masking is shown in FIGS. 1A–1C, in which a short sinusoidal tone 10 produces a masking threshold 12. See John G. Beerends and Jan A. Stemerdink, *A Perceptual Audio Quality Measure Based on a Psychoacoustic Sound Representation*, 40 J. Audio Engineering Soc'y 963, 966 (1992).

"Perceptual coding" techniques employing the above-discussed principles are presently used in signal compression and are based on three types of masking: frequency domain, time domain and noise level. The basic principle of frequency domain masking is that when certain strong signals are present in the audio band, other lower level signals, close in frequency to the stronger signals, are masked and not perceived by a listener. Time domain masking is based on the fact that certain types of noise and tones are not perceptible immediately before and after a larger signal transient. Noise masking takes advantage of the fact that a relatively high broadband noise level is not perceptible if it occurs simultaneously with various types of stronger signals.

Perceptual coding forms the basis for precision audio sub-band coding (PASC), as well as other coding techniques used in compressing audio signals for mini-disc (MD) and digital compact cassette (DCC) formats. Specifically, such compression algorithms take advantage of the fact that certain signals in an audio channel will be masked by other stronger signals to remove those masked signals in order to be able to compress the remaining signal into a lower bit-rate channel.

Another deficiency of the prior art techniques for simultaneously transmitting data with audio signals is that if the signals are transmitted through a channel which implements a lossy compression algorithm, such as the MPEG compression algorithm, the data, or at least portions thereof, will likely be removed, as most such compression algorithms divide the audio channel into a plurality of subbands and then encode and transmit only the strongest signal within each subband. Regardless of which of the previously-described techniques is used, it is highly unlikely that the data will ever be the strongest signal in a subband; therefore, it is unlikely that any portion of the data will be transmitted. Moreover, with respect to the spread spectrum techniques, even assuming the data happens to be the strongest signal in one or two subbands, because the information is spread throughout the signal spectrum, the information contained in such subbands will comprise only a small portion of the total information carried by the data and therefore is likely to be useless.

Accordingly, what is needed is a system for simultaneously transmitting ancillary codes and audio signals that utilizes the advantages of perceptual coding techniques and which is capable of transmitting ancillary codes through a lossy compressed channel.

SUMMARY OF THE INVENTION

The foregoing problems are solved and a technical advance is achieved by a communication system for simultaneously transmitting ancillary codes and audio signals via a conventional audio communications channel using perceptual coding techniques. In a further departure from the art, a multilayer, artificial neural network ("NN") at an encoder monitors an audio signal to detect "opportunities" to insert the ancillary code such that the inserted code is masked by the audio signal, as defined by the "perceptual entropy envelope" of the audio signal. The output of the NN controls a clock circuit for controlling the transmission frequency or frequencies of the ancillary code, a signal level control circuit for controlling the level at which the ancillary code is transmitted, and a burst timing circuit for controlling the timing of transmission of the ancillary code. Under the control of the NN, one or more whitened direct sequence spread spectrum and/or a narrowband FSK ancillary code is combined with the audio signal at the time, frequency and level determined by the NN such that the ancillary code is masked by the audio signal.

In a preferred embodiment, an ancillary code containing, for example, a number for identifying a particular program or program source, is generated by a conventional computer and is input to an encoder of the communications system of the present invention via an RS232 interface. The ancillary code is processed by a first preprocessing circuit, which processes the ancillary code using block encoding and bit interleaving techniques to ensure virtually error-free transmission of the ancillary code. The ancillary code is then input to three transmission encoders, including a wideband spread spectrum encoder for encoding and transmitting the ancillary code as a wideband direct sequence spread spectrum signal at processing gains and levels related to noise masking opportunities as determined by the NN, a bandlimited spread spectrum encoder for generating and transmitting the ancillary code as a bandlimited direct sequence spread spectrum signal which is responsive to both noise and frequency masking opportunities as determined by the NN, and an FSK burst encoder for generating and transmitting the ancillary code as a narrowband FSK modulated signal in either burst or continuous mode which is responsive to time-masking opportunities as determined by the NN.

The levels of the signals output from the three transmission encoders are regulated by three variable attenuators, respectively, under the control of the NN via the level control circuit. The three signals are then merged with the audio signal to form a composite signal, which is transmitted via an audio channel to one or more receiving locations or recorded on any appropriate recording medium to be transmitted when the audio signal recorded thereon is played back. Additionally, the composite signal is input to a verification circuit comprising a channel simulator, which emulates the noise, bandwidth, phase delay and other characteristics of the audio channel, and a receiver. A verification signal output from the receiver is fed back to the NN, which uses the information contained therein to determine whether the signal can be accurately decoded to recover the ancillary code.

At one or more receiving locations, the composite signal is input to a decoder comprising a bandpass filter, the parameters of which are defined by the passband of the audio channel, and a preprocessing circuit, which adjusts the gain of the signal and converts it to a digital signal to facilitate decoding. The signal output from the preprocessing circuit is input to a receiver sync circuit, which performs sync acquisition of the ancillary code in quadrature phase using an iterative phase stepping procedure. Once sync acquisition has been accomplished and the phase of the ancillary code has been locked onto, a digital phase lock loop voltage controlled oscillator is used as a flywheel to retain phase sync between bursts of lock. Clock signals generated by the phase lock loop are input to a pseudo noise code generating circuit that produces a PN code, which is merged modulo-2 with the ancillary code for recovering the ancillary code contained in the wideband and/or bandlimited direct sequence spread spectrum signal(s) generated by the corresponding transmission encoder(s). The recovered information, which will typically comprise a fuzzy logic set, is then input to a back propagation perceptron-type neural network, which uses pattern and signature recognition techniques to perform block decoding, bit deinterleaving and acquisition confirm functions. This NN outputs a signal indicative of the decoded ID number.

Detection and decoding of the FSK ancillary code is performed by a band pass filter and an FSK decoder. The output of the FSK decoder is input to the decoder's NN and processed similarly as the spread spectrum signals.

In an alternative embodiment, a hardwired, simulated NN is used in place of the encoder's NN to implement the transmission opportunity rules. In particular, the simulated NN comprises a filterbank for filtering the audio signal into four subbands having center frequencies of 1.5 kHz, 2.0 kHz, 2.77 kHz and 4.0 kHz, respectively. The audio signals in each of the four subbands are fullwave rectified by appropriate rectifier circuitry, and then input to a plurality of threshold detectors for detecting three threshold levels per subband, as established by resistive voltage divider and variable threshold circuits. The signals output from the threshold detectors are then input to a plurality of timing circuits for implementing certain timing rules, including a high level transmission rule, a low level transmission rule, a five-second transmission rule, a one-second transmission rule, and a clap/laugh transmission rule.

DETAILED DESCRIPTION OF THE PREFERRED EMBODIMENT

Figure 1A:
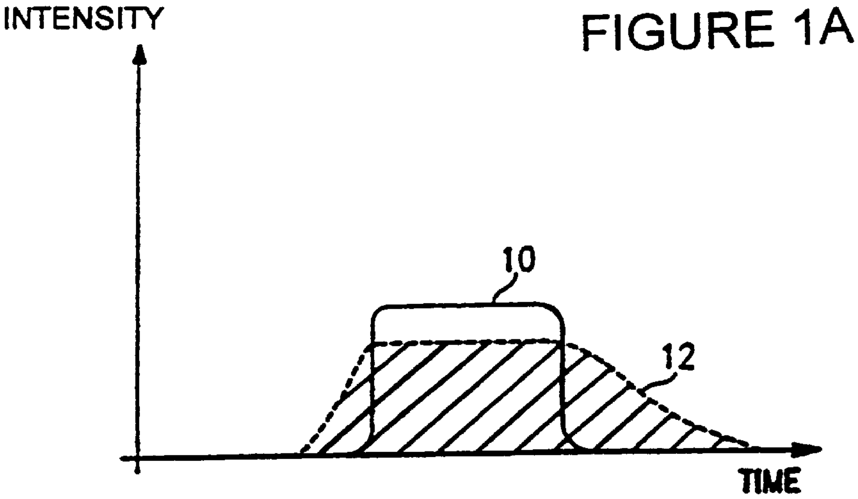
FIGS. 1*a*–1*c* comprise a schematic representation of the time-frequency domain masking characteristics of a short sinusoidal tone.
Figure 1B:
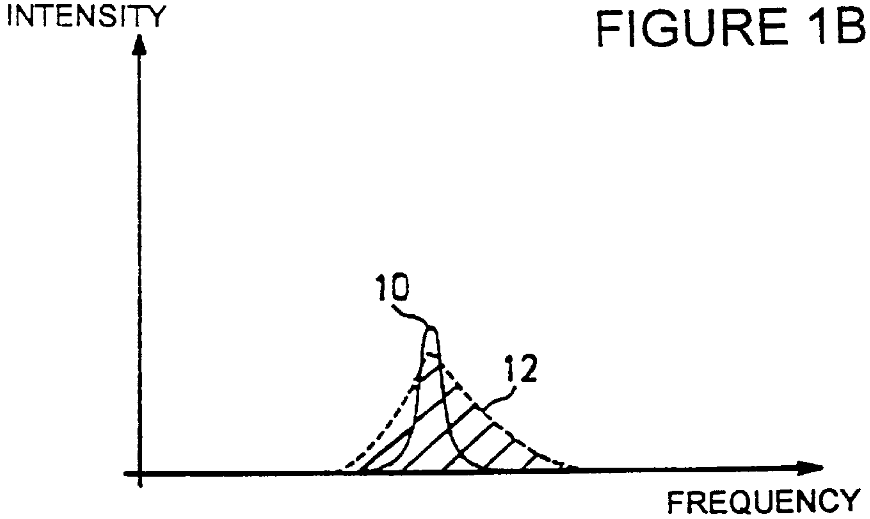
Figure 1C:
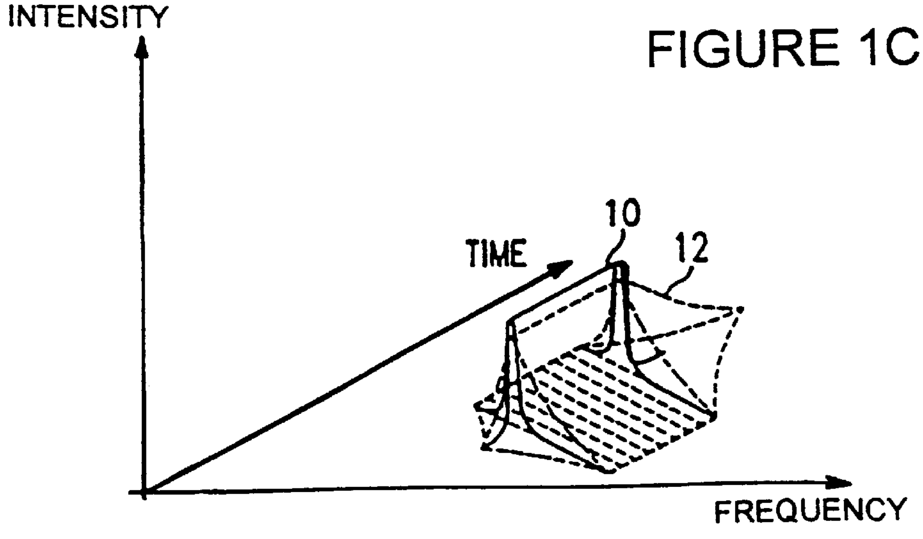

FIGS. 1*a*–1*c* illustrate a schematic representation of time-frequency domain masking of audio distortions in which a short sinusoidal tone 10 produces a masking threshold, or perceptual entropy envelope, 12.

Figure 2:
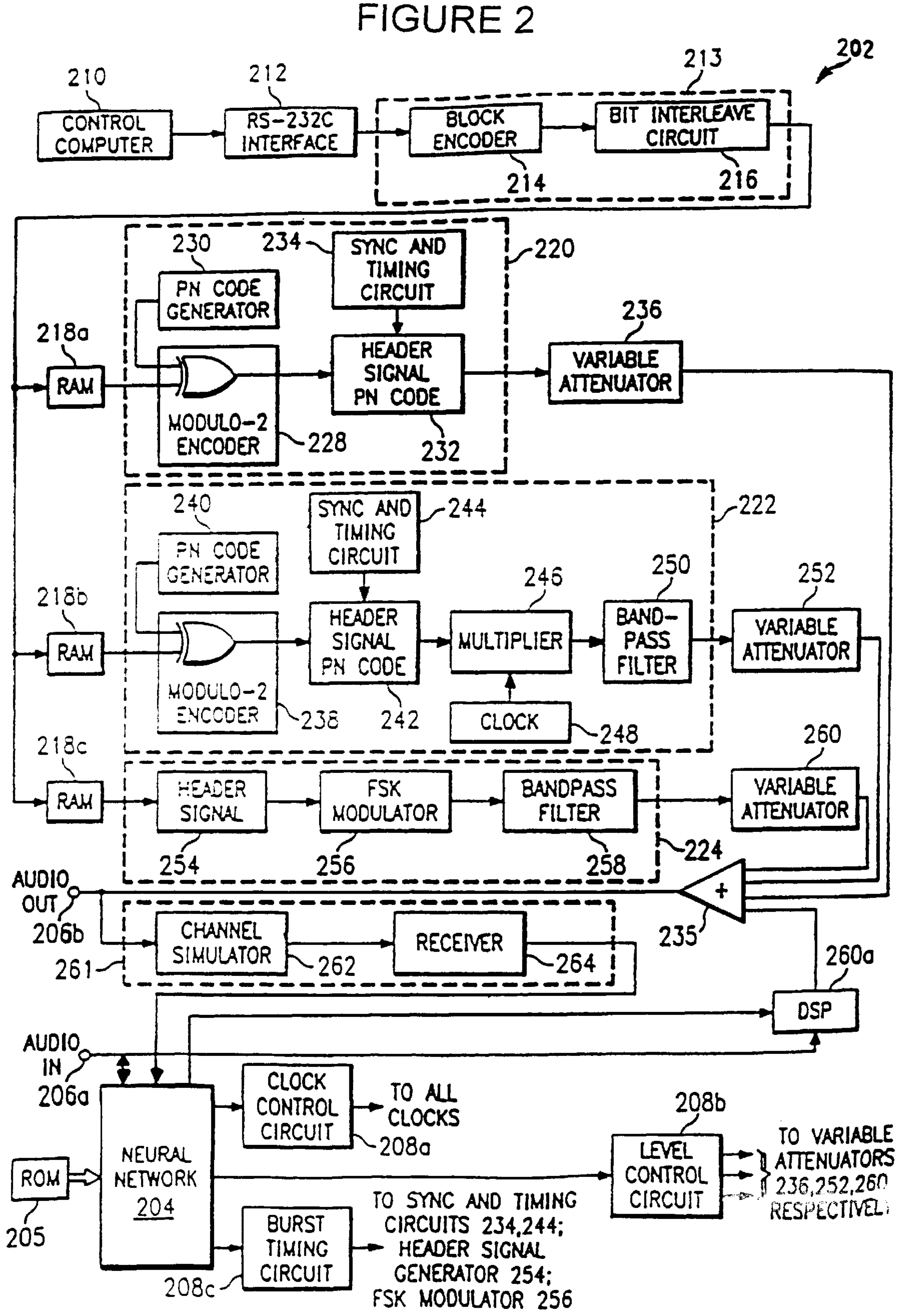
FIG. 2 is a schematic block diagram of an encoder embodying features of the present invention for encoding an ancillary code to be transmitted simultaneously with audio signals using perceptual coding techniques.

FIG. 2 is a schematic block diagram of an encoder 202 embodying features of the present invention for encoding, using perceptual coding techniques, an ancillary code to be transmitted simultaneously with audio signals via an audio channel (not shown), such as a television transmission channel. The encoder 202 includes a multilayer, artificial neural network ("NN") 204, which monitors the audio signal, via an audio-in terminal 206*a*, for "opportunities" to insert ancillary codes at times, frequencies and amplitudes such that they are not perceived by human ears. In other words, the NN 204 determines the "perceptual entropy envelope" of the audio channel, which, as previously described, is the three dimensional (time, frequency and amplitude) map of the optimal masking function of the audio channel. It should be understood by those skilled in the art that a neural network, such as the NN 204, comprises a combination of simple computational elements which are "trained" to perform specific mapping tasks between input and output data. As used herein, the term "neural network" also includes any necessary preprocessing circuitry, such as filters, timing circuits and others. The mapping function of a neural network is achieved after an initial lengthy training stage during which the NN 204 is supplied with input and output data which satisfy the mapping task. In the present embodiment, the input to the NN 204 comprises segments of audio signals and the required output is the auditory noise masking threshold (i.e., the perceptual entropy envelope) created by the audio signal segments. In this manner, the NN 204 is "trained" to extract the perceptually significant features from the audio signal at the audio-in terminal 206*a*, which features relate to the perceptual entropy envelope generated by successive frames of input ancillary codes. The algorithm for implementing the mapping function of the NN 204 is stored in a ROM 205, which in a preferred embodiment comprises a socketed chip, to make future upgrades easy and practical.

For purposes which will subsequently be described in greater detail, the NN 204 controls a clock control circuit 208*a*, a level control circuit 208*b*, and a burst timing circuit 208*c*. As will also be described in detail, under the control of the NN 204, the ancillary code will be encoded as one or more whitened direct sequence spread spectrum signals and/or a narrowband FSK ancillary code to be combined with the audio signal at a time, frequency and amplitude such that the ancillary code is masked by the audio signal.

A digital ancillary code, which may comprise a serial number or other identification number, is generated by a control computer 210 and input to the encoder 202, preferably via an RS232-C interface 212, although it should be understood that any number of different types of interfaces may be used. The ancillary code generated by the control computer 210 may be, for example, a number for identifying a program, a program source, a radio or television network or a local radio or television station, or a number to be encoded on a compact disc (CD) for identifying a particular, program, artist or song. The ancillary code output from the control computer 210 is input to a preprocessing circuit 213 comprising a block encoder 214 for encoding the ancillary code to enable the detection and correction of errors therein when it is received at a decoder (FIG. 3), and a bit interleave circuit 216 for enabling the encoded number to withstand error hits in the transmission path. An exemplary system and method for performing such block encoding and bit interleaving techniques is described in detail in U.S. Pat. No. 4,672,605 to Hustig et al., which is hereby incorporated by reference. The ancillary code output from the preprocessing circuit 213 is stored in each of three random access memories (RAMs) 213*a*, 218*b* and 218*c* for use by a wideband spread spectrum encoder 220, a bandlimited spread spectrum encoder 222 and an FSK burst encoder 224, respectively, for purposes which will be described.

Figure 3:
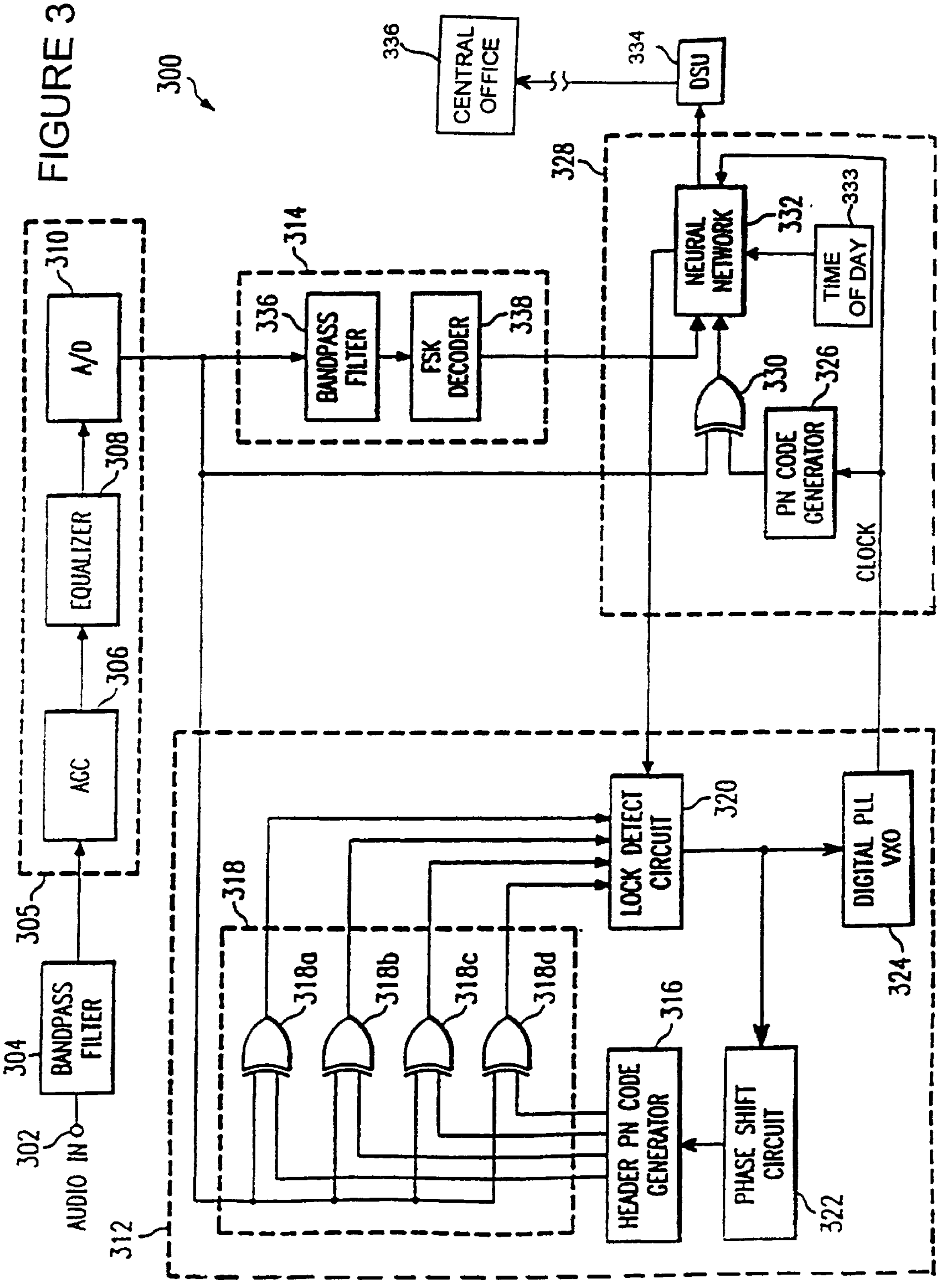
FIG. 3 is a schematic block diagram of a decoder embodying features of the present invention for decoding ancillary codes encoded using the encoder of FIG. 2.

The wideband spread spectrum encoder 220 encodes the ancillary code as a wideband direct sequence spread spectrum signal at processing gains and levels related to noise masking opportunities in the audio signal as determined by the NN 204. Specifically, the NN 204 dynamically determines the noise masking perceptual entropy envelope for controlling the spread spectrum processing gain (i.e., ratio of data rate to pseudo-nose (PN) code frequency rate) and the signal level of the wideband pseudo-noise transmission output from the encoder 220. The ancillary code stored in the RAM 218*a* is input to a modulo-2 encoder 228, where it is merged with a synchronous PN code from a PN code generator 230 to form a direct sequence signal. In a preferred embodiment, the modulo-2 encoder 228 is implemented using an exclusive-OR (XOR) logic gate. The direct sequence signal output from the modulo-2 encoder 228 is input to a header signal generator 232, which adds a PN code header signal to each frame thereof, in accordance with synchronization and timing signals from a sync and timing circuit 234, in order to improve acquisition of the ancillary code at the decoder location(s) (FIG. 3).

As shown in FIG. 2, the sync and timing circuit 234 is controlled by signals from the burst timing circuit 208*c*. The spectrum of the direct sequence signal output from the header signal generator 232 is relatively flat over the bandwidth of the channel, as is typical of direct sequence signals in general. Once the PN code header signal has been added to each frame or segment of the ancillary code, the resultant wideband spread spectrum code is output to a summer 235 via a variable attenuator 236, which establishes the transmit level of the signal in accordance with control signals from the level control circuit 208*b*, which in turn is controlled by signals from the NN 204.

The bandlimited spread spectrum encoder 222 is similar to the wideband spread spectrum encoder 220, except that it encodes the ancillary code as a bandlimited, rather than a wideband, direct sequence spread spectrum signal responsive to both noise masking and frequency masking opportunities in the audio channel, as determined by the NN 204. As with the encoder 220, the ancillary code stored in the RAM 218*b* is input to a modulo-2 encoder 238 where it is merged with a PN code from a PN code generator 240 to form a direct sequence signal. The direct sequence signal output from the modulo-2 encoder 238 is input to a header signal generator 242, which adds a PN code header signal to each frame thereof in accordance with synchronization and timing signals from a sync and timing circuit 244. As shown in FIG. 2, the sync and timing circuit 244 is controlled by signals from the burst timing circuit 208*c*. As with the signal generated by the encoder 220, the spectrum of the direct sequence signal output from the header signal generator 242 is relatively flat over the bandwidth of the channel. Once the PN code header signal has been added to the direct sequence signal, the signal is output to a multiplier 246, where it is multiplied with a signal from a synchronous clock 248 having a high clock-to-PN code frequency. In this manner, the frequency of the signal may be unconverted to a selected frequency, which is preferably centered in a selected subband of the audio channel. The signal output from the multiplier 246 is then bandlimited by a bandpass filter 250, which translates the direct sequence signal energy into the selected subband. The resultant bandlimited spread spectrum ancillary code is output to the summer 235 via a variable attenuator 252, which, under the control of the level control circuit 208*b*, controls the amplitude at which the ancillary code is transmitted.

The FSK burst encoder 224 encodes the ancillary code as a narrowband signal which is related to time masking and frequency masking opportunities. The ancillary code stored in the RAM 218*c* is input to a header signal generator 254, which adds a header to each frame of data to facilitate acquisition of the data at the decoder location(s) (FIG. 3). The ancillary code is then input to an FSK encoder 256, which FSK modulates the code, and to a bandpass filter 258, which bandlimits the code to concentrate the signal energy into a selected subband. As shown in FIG. 2, the header signal generator 254 and the FSK encoder are controlled by signals from the burst timing circuit 208*c*.

The resultant FSK ancillary code is then output to the summer 235 via a variable attenuator 260, which, under the control of the level control circuit 208*b*, controls the amplitude at which the signal is transmitted. It should be understood that the FSK ancillary code output from the encoder 224 may be continuous, but dynamically varying in level, or may be in burst mode, triggered by a time masking opportunity, as determined by the NN 204. However, as will be described in detail, in a particular implementation in which the ancillary code must undergo lossy compression according to a known compression algorithm, such as MPEG, the signal must be transmitted in burst mode in order to survive such compression.

The wideband spread spectrum, bandlimited spread spectrum and FSK ancillary codes output from the encoders 220–224, respectively, are combined by the summer 235 with the audio signal at the terminal 206*a* to form a composite signal, which is output to the audio channel at the terminal 206*b*. Alternatively, the composite signal may be recorded on any appropriate recording medium, such as a CD, in which case the signal will be transmitted when the CD is "played back." In a preferred embodiment, as illustrated in FIG. 2, before being input to the summer 235, the audio signal is input to a device, such as a digital signal processor (DSP) 260*a*, which, under the control of signals from the level control circuit 208*b*, functions to attenuate the level of the audio signal in certain subbands. Such attenuation might be necessary, for example, if the NN 204 signals an FSK burst or bandlimited spread spectrum signal transmission and then detects an unexpected burst of energy in the subband of the audio signal that would interfere with the data transmission. The composite signal is also input to a verification circuit 261 comprising a channel simulator 262, which adds noise to and degrades the composite signal slightly more than would be typical during transmission over the actual audio channel, and a typical receiver 264. The ability of the receiver 264 successfully to decode the data information contained in the composite signal is verified and a verification signal is transmitted to the NN 204.

It should be obvious that if perceptual coding techniques such as those described above are used to encode the ancillary code to be transmitted, then perceptual compression schemes, such as MPEG and PASC, will most likely remove the data from the composite signal before or during transmission. Therefore, to overcome this problem, the NN 204 must be trained not only to listen to the channel for opportunities at which the ancillary code may be transmitted imperceptibly, but also to compensate for the particular compression scheme to be encountered.

For example, one well-known and widely used compression scheme divides the audio band into thirty-two (32) subbands. Taking advantage of frequency domain masking, and to a certain extent, time domain masking, only the strongest signal in each subband is encoded and transmitted on the assumption that the remaining signals in the subband would not be heard anyway, as they would be masked by the stronger signal. In this case, in order to ensure that the ancillary code is transmitted, the NN 204 must be trained to "listen" for opportunities to transmit the ancillary code as an FSK burst signal where the ancillary code will be the strongest signal in a particular subband, with its transmission masked by following strong, broadband transients (time domain masking) in proximate subbands.

In such an embodiment, it would be possible, if not preferable, to preselect one or more subbands for transmitting the ancillary code(s). For example, a first subband may be selected for transmitting an ID code identifying the television network broadcasting the audio signal, another subband may be selected for transmitting an ID code identifying the distributor of the audio signal, and a third subband may be selected for transmitting an ID code identifying the local station transmitting the audio signal. In a preferred embodiment, in order to maximize speed and limit errors in data throughput to a certain level, the data transmission occurs in a "partial response" mode, meaning that the ancillary code is transmitted at a bit-rate faster than what would normally be considered optimum to ensure a clean decode at the decoder location(s) (FIG. 3), with the result being that the data received at the decoder location(s) comprises a "fuzzy logic" set. However, while transmission in a partial response mode is typically not optimum, it may be necessary to ensure that the ancillary code is transmitted quickly enough to fit into narrow subbands. As will be described, correction for errors resulting from partial response mode transmission is performed by a neural network (FIG. 3) at each decoder location, which is trained in pattern recognition to determine the identity of the ancillary codes.

FIG. 3 is a schematic block diagram of a decoder 300 embodying features of the present invention for retrieving (i.e., decoding) ancillary codes encoded using the encoder 202 and transmitted via the audio channel. The decoder 300 receives the composite signal transmitted via the audio channel (not shown) at an audio-in terminal 302. The received signal is input to a bandpass filter 304, the parameters of which are defined by the passband of the audio channel, for filtering out any unnecessary frequencies. The signal output from the filter 304 is input to a signal preprocessor 305 comprising an automatic gain controller (AGC) 306, which maintains the amplitude of the signal within an acceptable range, an equalizer 308, which compensates for known phase and amplitude distortions in the signal path, and an analog-to-digital (A/D) converter 310, which converts the signal to digital form to facilitate processing. The digital signal output from the preprocessor 305 is input to a receiver sync circuit 312 and to an FSK signal processing circuit 314.

The receiver sync circuit 312 performs sync acquisition of the wideband and/or bandlimited spread spectrum signals in quadrature phase using an iterative phase stepping procedure, as hereinafter described. A header PN code identical to that generated by the generators 232, 242 (FIG. 2) is generated by a header signal generator 316 and merged modulo-2 with the signal output from the preprocessor 305, in quadrature phase, in a wide dynamic range (i.e. 18- to 24-bits of resolution) digital signal processor (DSP) 318. In the illustrated embodiment, the DSP 318 comprises four XOR gates 318*a*–318*d*. Four signals output from the DSP 318 are input to a lock detect circuit 320 for detecting when the phase of the ancillary code is locked with that of the header PN code from the generator 316. A signal indicative of whether a phase lock has been detected is input to a phase shift circuit 322 and a digital phase lock loop 324. So long as the signal output from the circuit 320 indicates that the phase of the signal has not been locked onto, the phase shift circuit continues to shift the phase of the header PN code from the generator 316 until the circuit 320 detects a phase lock. It should be understood that, typically, lock will occur in bursts, when the transmitted data is received with the highest quality. For this reason, the phase lock loop 324 operates as a flywheel, retaining clock phase sync between bursts of lock.

Timing signals generated by the phase lock loop 324 are fed to a PN code generator 326 of a decoder circuit 328. The PN code is merged modulo-2 with the signal output from the preprocessing circuit 305 by an XOR gate 330 to recover the ancillary code containing the ID number. The output of the XOR gate 330 will typically be a fuzzy logic set, because, as previously indicated, transmission of the data usually occurs in a partial response mode. The signal output from the XOR gate 330 is input to a neural network (NN) 332, which in a preferred embodiment comprises a "back propagation perceptron" that uses pattern and signature recognition techniques to perform block decoding, bit deinterleaving and acquisition confirm functions. As such pattern and signature recognition techniques and backpropagation perceptrons for implementing same are well known in the art they will not be further described.

Once acquisition of the ancillary code is confirmed by the NN 332, using pattern recognition, this fact is indicated to the lock detect circuit 320 as confirmation that the lock is valid. A time stamp from a time of day clock 333 is added to the decoded ancillary code, which is then output from the NN 332 after a relatively long delay, for example, ten seconds. Alternatively, the signal output from the NN 332 may simply indicate that the decoded ancillary code is the same as the previous ancillary code, that the decoded ancillary code is indeterminate, or that the decoded ancillary code is different than the previous number, in which case the new decoded ancillary code is output as described above. The ancillary codes output from the NN 332 is held in a data storage unit (DSU) 334, the contents of which may be transferred at regular intervals by any appropriate means to a central processing unit 336, which processes the recovered ancillary codes and times such that they may be used, for example, in performing radio and television surveys and program broadcast verification, as well as music royalty tracking applications, as described below.

Referring again to the FSK processing circuit 314, to decode an ancillary code transmitted as an FSK burst signal, the signal output from the preprocessor 305 is input to a bandpass filter 336, similar to the filter 258, and then to an FSK decoder 338 for decoding the ancillary code. Again, because data transmission occurs in a partial response environment, the output of the FSK decoder 338 will be a fuzzy logic set. The fuzzy logic signal output from the FSK decoder 338 is input to the NN 332, which processes the signal in the same manner as signals input thereto from the XOR gate 330.

Figure 4A:
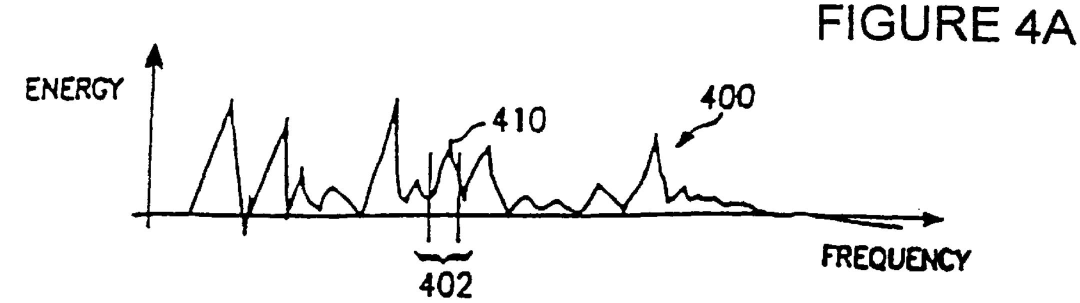
FIG. 4*a* illustrates the frequency spectrum of an exemplary audio signal for use with the system of the present invention.
Figure 4B:
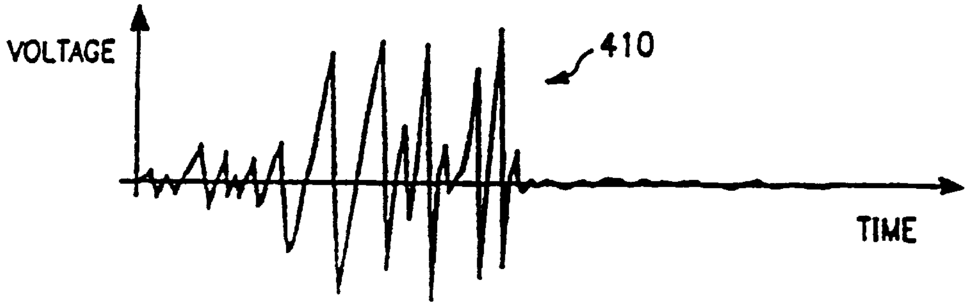
FIG. 4*b* is a timing diagram of the voltage of the audio signal of FIG. 4*a* within a selected subband.
Figure 4C:
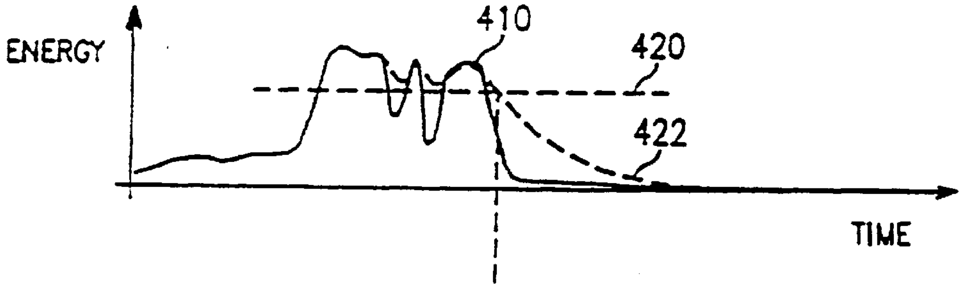
FIG. 4*c* is a timing diagram of the energy of the audio signal of FIG. 4*a* within the selected subband.
Figure 4D:
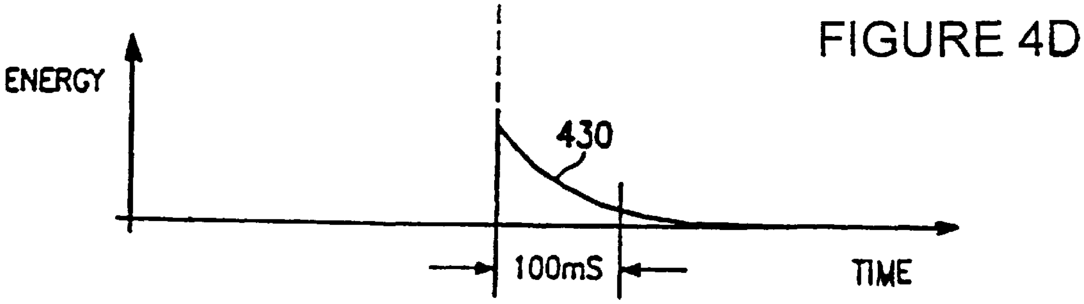
FIG. 4*d* is a timing diagram of the energy of an encoded ancillary code to be transmitted with and masked by the audio signal of FIG. 4*a* within the selected subband.
Figure 4E:
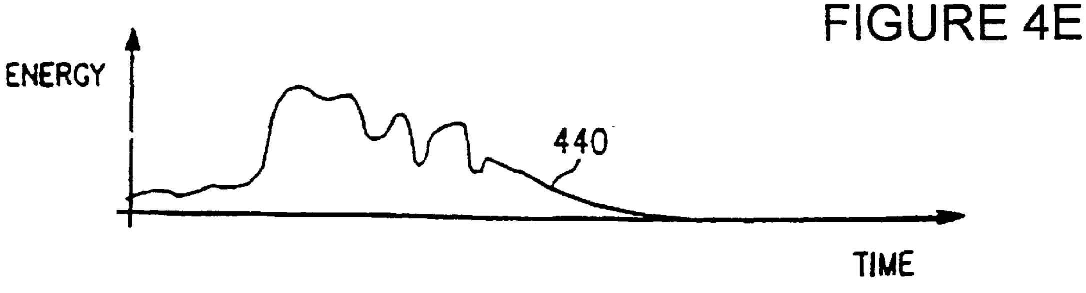
FIG. 4*e* is a timing diagram of a composite signal within the selected subband comprising the audio signal of FIG. 4*a* and the ancillary code of FIG. 4*d*.

FIGS. 4*a*–4*e* illustrate various frequency and timing diagrams of exemplary ancillary codes and audio signals used and/or produced by the system of the present invention. FIG. 4*a* illustrates the energy of an audio signal 400, such as that which might be received at the audio-in terminal 206*a*, with respect to frequency. FIG. 4*b* is a timing diagram of the voltage of a portion 410 of the audio signal 400 within a selected subband 402 (FIG. 4*a*). FIG. 4*c* is a timing diagram of the energy of the audio signal portion 410 within the subband 402. Also shown in FIG. 4*c* is a time masking threshold 420 of the audio signal portion 410, as well as the perceptual entropy envelope 422 thereof, it being understood that the audio signal portion 410 will mask signals having signal energy below its perceptual entropy envelope 422. FIG. 4*d* illustrates an ancillary code 430, such as that which might be encoded by the encoder 202, to be transmitted with and masked by the audio signal portion 410. It should be noted that the ancillary code 430 occurs as a burst signal which undergoes exponential decay for 100 ms. FIG. 4*e* is a timing diagram of a composite signal 440, such as that which might be output from the encoder 202 via the audio out terminal 206*b*, comprising the audio signal portion 410 and the ancillary code 430.

In operation, it is anticipated that the above-described invention may be advantageously used for several purposes, which include, but are not limited to, program broadcast verification, television and radio surveys and music royalty tracking. For example, in television and radio survey applications, the audio signal at the terminal 206*a* comprises programming signals and the ancillary code comprises ID codes for identifying the local station, the broadcaster, the distributor, certain programming and advertisements, and/or the like. The ancillary code may be encoded, as described above, transmitted with the television or radio audio signal, and received at a decoder located in a television viewer's or radio listener's home household or at some central location. The decoded ID code(s) may then be used to verify the broadcast of particular programs in corresponding time slots. In an audience measurement application, the decoded ID code(s) may then be used to determine the size of the audience for a particular program or time slot at any given time. In a music royalty tracking application, it is envisioned that encoded ID numbers be recorded on CDs such that when the CD is played, the ancillary code containing the ID code identifying the music programming is transmitted with the audio signal recorded thereon. Again, the encoded ancillary code may be received and decoded at various strategically located decoding locations having a decoder 300. Typically, this technique will be used to collect data for collecting royalties for computing ratings, such as the "Billboard Top 100."

Figure 5A:
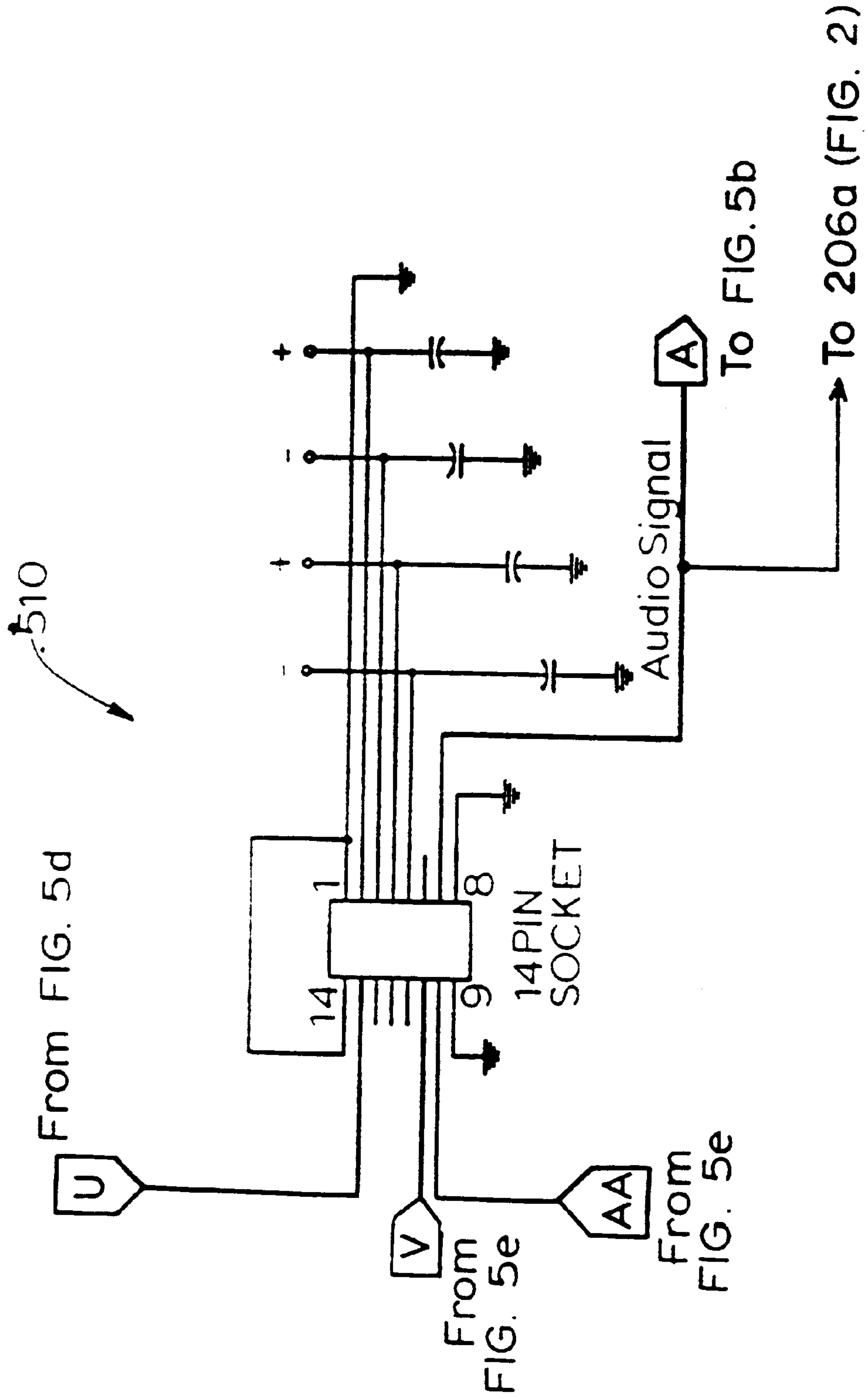
FIGS. 5*a*–5*h* are a schematic block diagram of a simulated neural network for use in implementing an alternative embodiment of the-present invention.
Figure 5B:
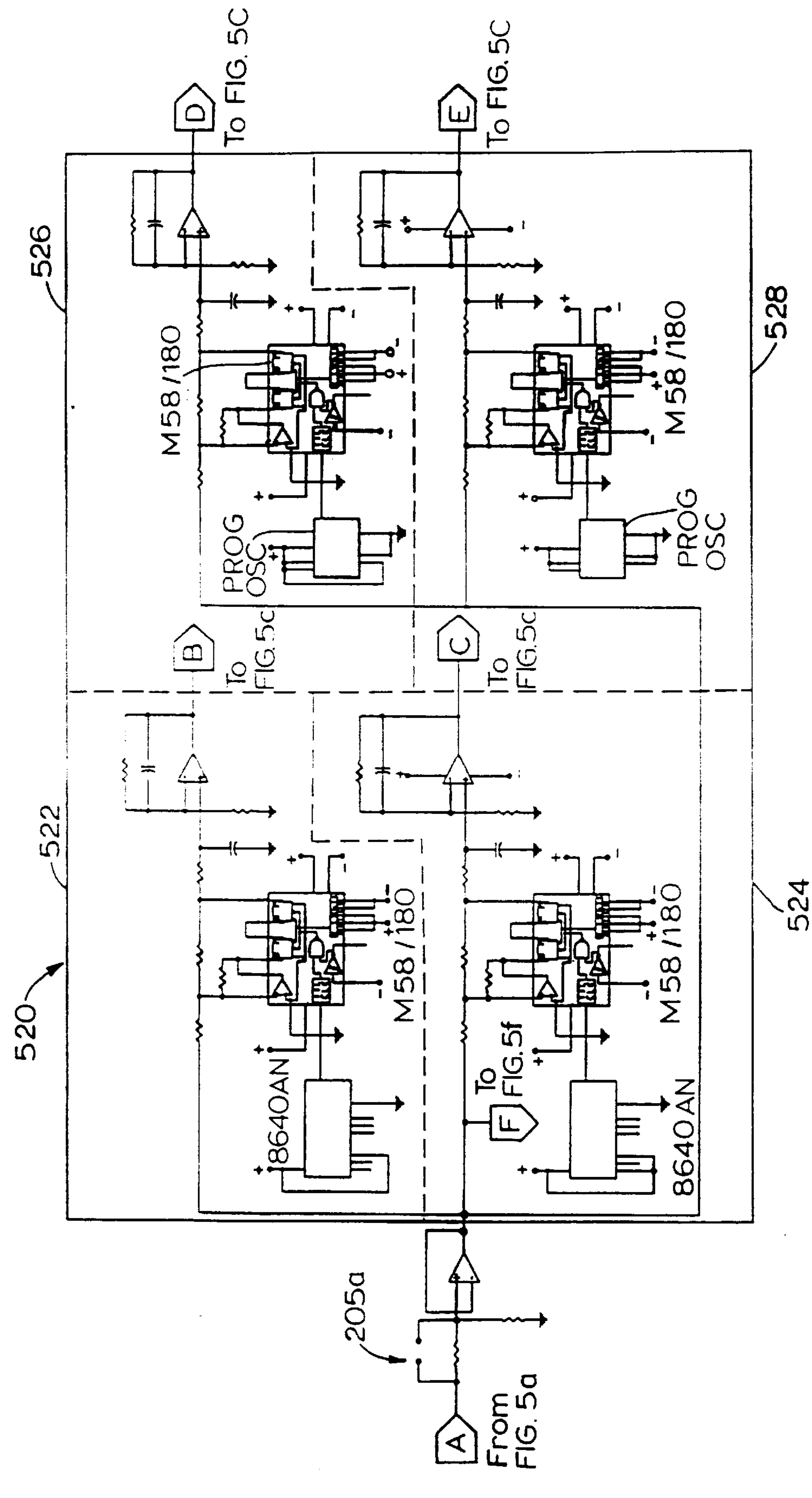

In an alternative embodiment, the first NN 204 shown in FIG. 2 may be replaced by a simulated, hardwired NN, such as that shown in FIGS. 5*a*–5*h*. In particular, FIGS. 5*a*–5*h* comprise a schematic block diagram of a simulated NN for implementing such an alternative embodiment of the present invention. As shown in FIG. 5*a*, an audio signal is connected to pin 7 of a 16-pin interface connector 510, via a complementary connector (not shown), and input to a filterbank 520, as shown in FIG. 5*b*. In addition, the audio signal on pin 7 of the connector 510 is input to the DSP 260*a* (FIG. 2) and the neural network 204 (FIG. 2) via the audio-in terminal 206*a* (FIG. 2).

Figure 5C:
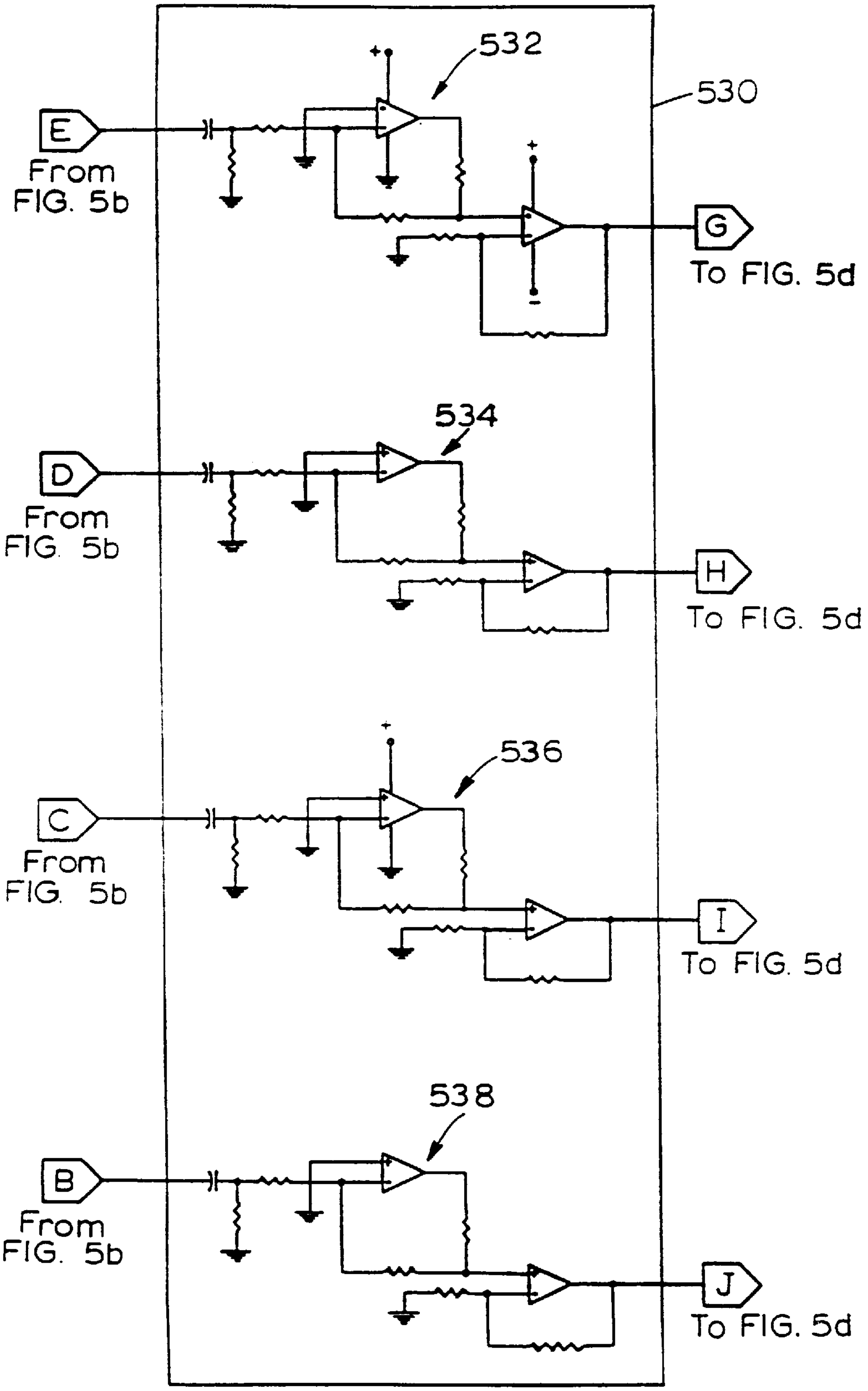
Figure 5D:
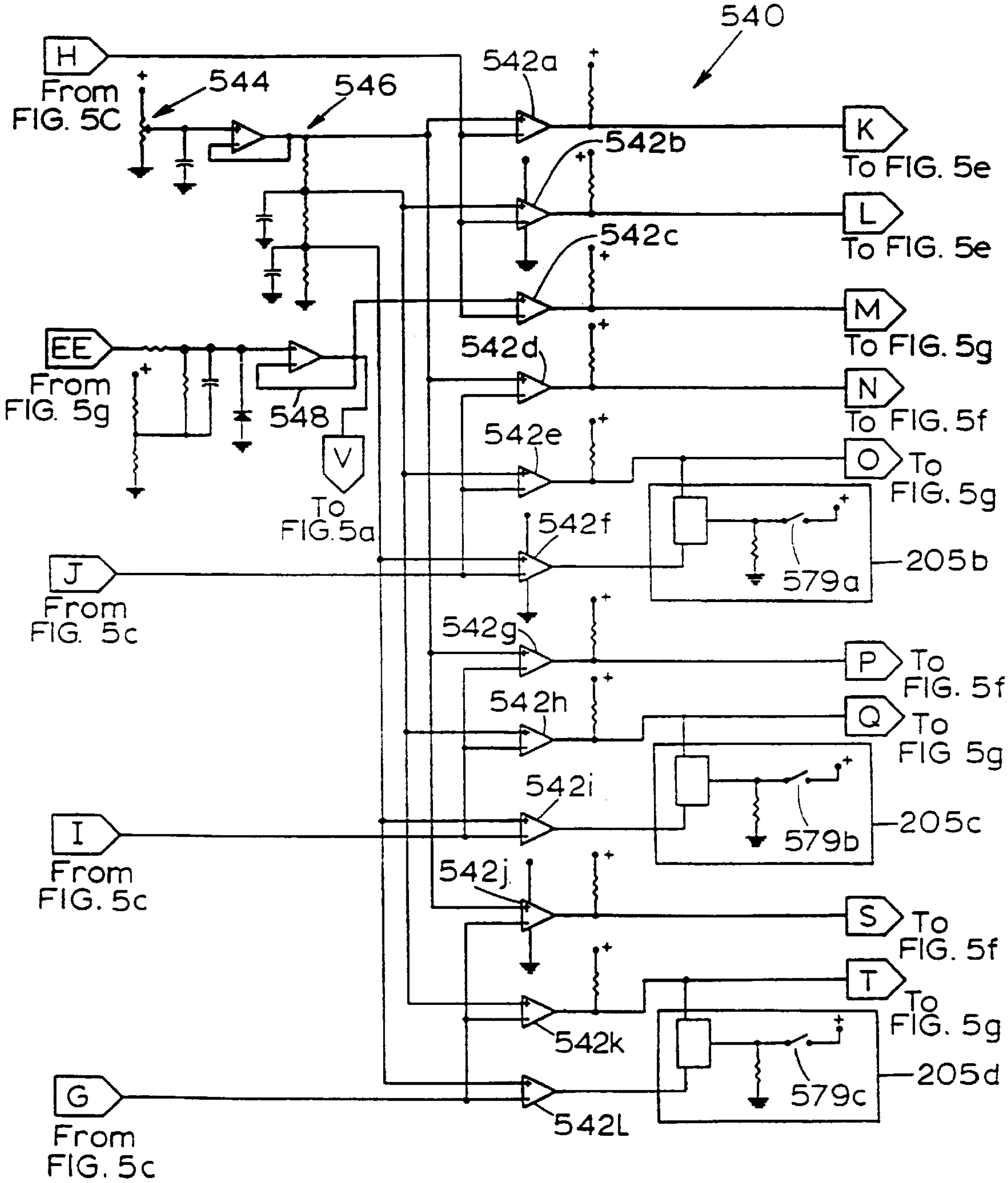

Referring to FIG. 5*b*, the filterbank 520 comprises four filters 522, 524, 526 and 528 for filtering the audio signal input thereto into four subbands, respectively centered at 1.5 kHz, 2.0 kHz, 2.77 kHz (the transmission subband) and 4.0 kHz. The audio signals in the four subbands are then input to a filtering circuit 530, as shown in FIG. 5*c*, comprising four fullwave rectifier circuits 532, 534, 536 and 538. The rectified audio signals are output from the rectifier circuits 532, 534, 536, 538, to a threshold detector circuit 540, as shown in FIG. 5d, comprising twelve LM339 threshold detectors 542*a*–542*l*. The threshold detector circuit 540 is used to detect three threshold levels per subband, as established by voltage dividers 544, 546, and by a variable threshold circuit 548. As will be described with reference to FIGS. 5D–5F, the signals output from the threshold detectors 542 are utilized by circuitry for implementing certain transmission opportunity rules.

In particular, the primary objective of the "rules-based" simulated NN shown in FIGS. 5A–5H is to utilize time masking to transmit data packets within a television sound channel. The transmission subband is centered at 2.77 kHz and covers two MPEG layer 11 bands. The method is to transmit the ancillary code immediately following an audio signal surge according to the certain transmission rules implemented in hardwired circuitry.

Figure 5E:
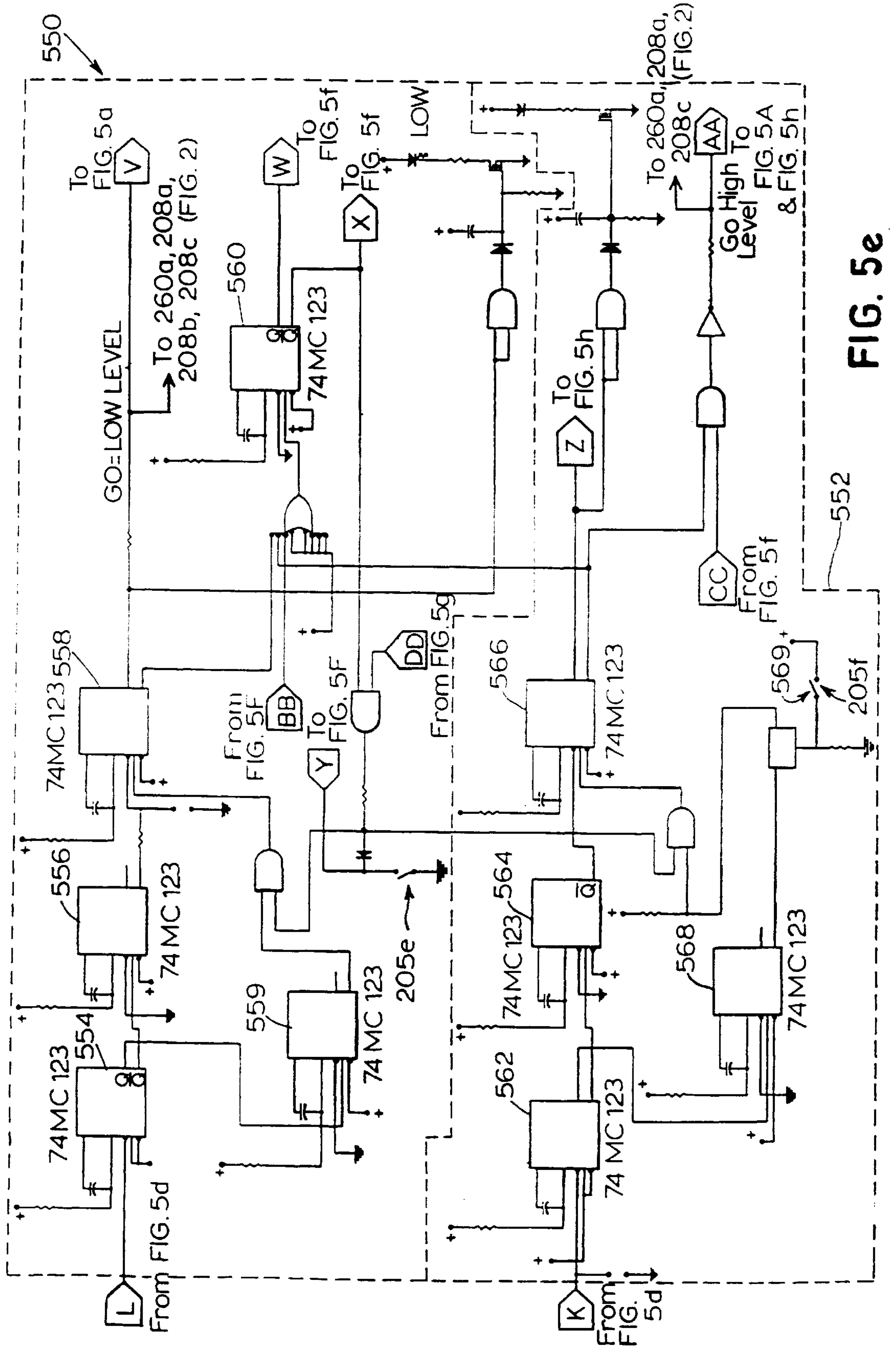

In particular, FIG. 5*e* illustrates circuitry 550 for sending a low level transmission and circuitry 552 for sending a high level transmission. To send a low level transmission, a surge envelope detector 554, having a time constant of 2 ms and 30 mVRMS sensitivity, four cycles minimum, operates on the fullwave rectified signal input thereto at pin 1 and generates a logic 1 at output pin 4 during an audio signal surge. The signal output on pin 4 of the detector 554 is input to an end of surge detector 556, which generates a 1 ms pulse on output pin 12 at the end of the surge. The signal output on pin 12 of the detector 556 is input to an inhibit/send circuit 558, which inhibits transmission of the low level signal (i) if the length of the surge has not been long enough (i.e., 10 ms minimum), as determined by a length of surge circuit 559, (ii) if less than 450 ms have elapsed since the last transmission of any type (low or high level), as determined by a timer circuit 560, or (iii) if a clap/laugh circuit (FIG. 5*g*) is activated and detects a laugh or clap. If all of the above conditions are met, a "GO=LOW LEVEL" signal is transmitted to pin 11 of the connector 510 (FIG. 5*a*). The GO=LOW LEVEL signal is also transmitted to the DSP 260*a* (FIG. 2), the clock control circuit 208*a* (FIG. 2), the level control circuit 208*b* (FIG. 2), and the burst timing circuit 208*c* (FIG. 2).

Similarly, to send a high level transmission, a surge envelope detector 562, having a time constant of 2 ms and 60 mVRMS sensitivity, four cycles minimum, operates on the fullwave rectified signal input thereto at pin 1 and generates a logic 1 at output pin 4 during an audio signal surge. The signal output on pin 4 of the detector 562 is input to an end of surge detector 564, which generates a 1 ms pulse on output pin 12 at the end of the surge. The signal output on pin 12 of the detector 564 is input to an inhibit/send circuit 566, which inhibits transmission of the high level signal (i) if the length of the surge has not been long enough (i.e., 5 ms minimum), as determined by a length of surge circuit 568 activated by a dip switch 569, (ii) if less than 450 ms have elapsed since the last transmission of any type (low or high level), as determined by the circuit 560, or (iii) if the clap/laugh circuit (FIG. 5*g*) is activated and detects a laugh or clap. If all of the above conditions are met, a "GO=HIGH LEVEL" signal is transmitted to pin 10 of the connector 510 (FIG. 5*a*). The GO=HIGH LEVEL signal is also transmitted to the DSP 260*a* (FIG. 2), the clock control circuit 208*a* (FIG. 2), the level control circuit 208*b* (FIG. 2), and the burst timing circuit 208*c* (FIG. 2).

Figure 5F:
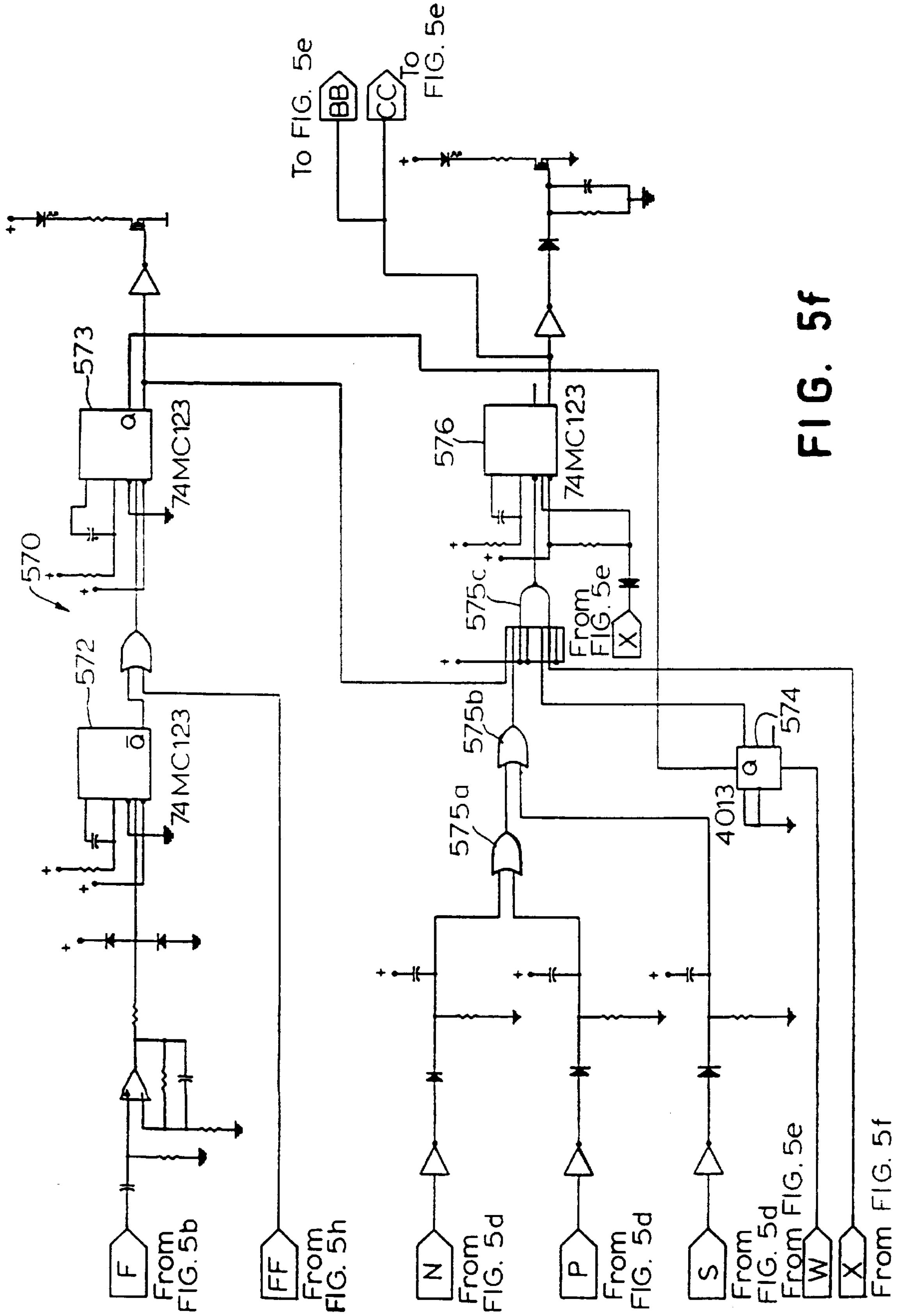

Referring to FIG. 5*f*, a one second send circuit 570 activates a high level transmission if the following rules are met. First, a fade-to-black detector 572 must detect a 100 ms fade below 35 VRMS. If such a fade is detected, a one second time period is established by a one second timer circuit 573. The timer circuit 573 sets a D flipflop trigger circuit 574 at the beginning of each one second time period. The circuit 574 is reset by any type of transmission. During the period that the trigger circuit 574 is set, a high level transmission is activated if a high level surge is detected in the subband centered at 1.5 kHz, or a high level surge is detected in the subband centered at 2.0 kHz, or a high level surge is detected in the subband centered at 4.0 kHz, it being recognized that the circuit 570 may be reconfigured to require all, rather than only one, of these conditions to be met by replacing OR gates 575*a* and 575*b* with AND gates. The activation of a transmission causes a one-shot 576 to produce a 1 mS pulse to the circuit 552 (FIG. 5*e*), which in turn produces a high level send signal to the connector 510.

Figure 5G:
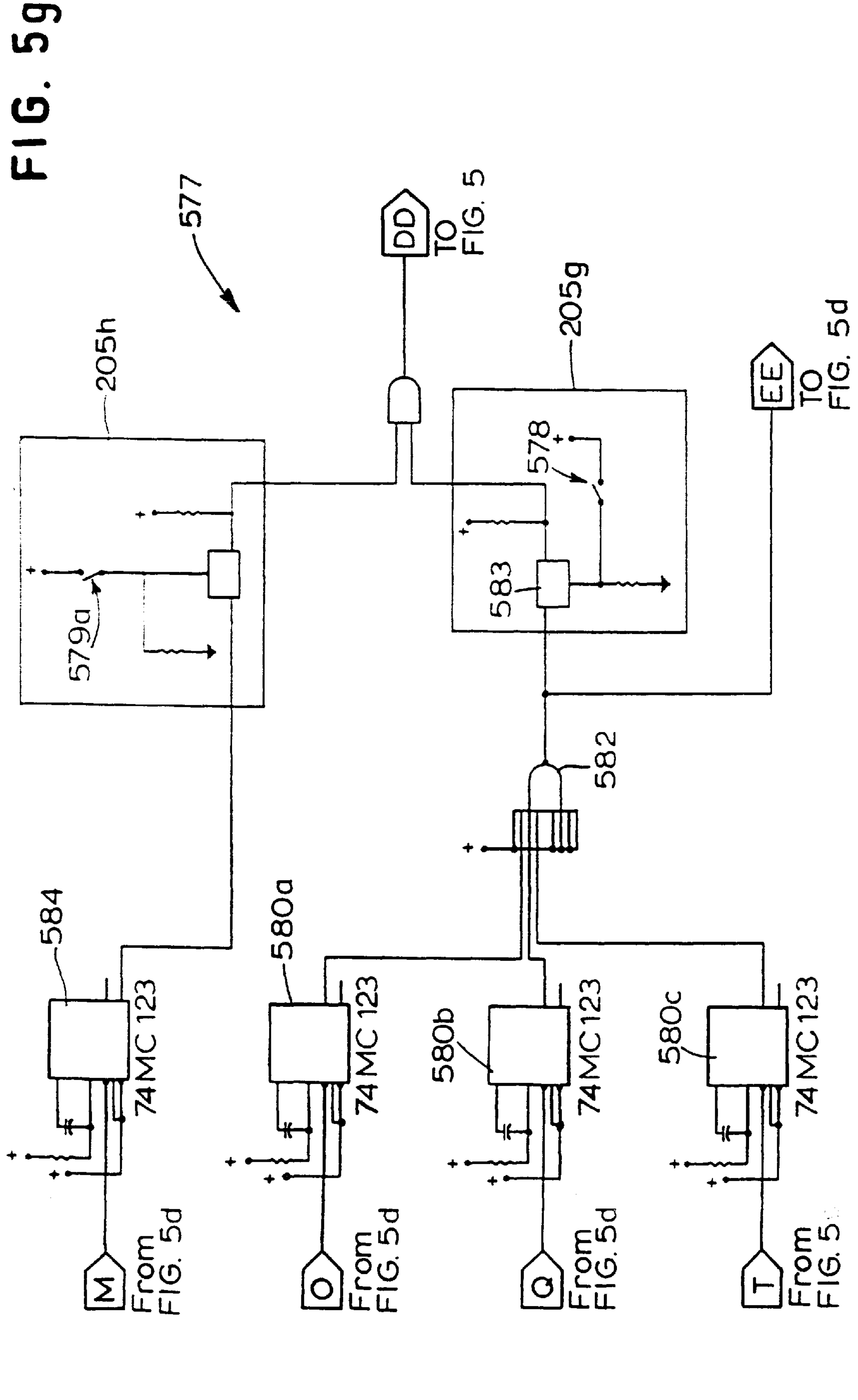

A clap/laugh circuit 577 is shown in FIG. 5*g*. The clap/laugh circuit 577 is activated by a dip switch 579 (FIG. 5*d*). When the circuit 577 is active and dip switches 579*a*, 579*b* and 579*c* (FIG. 5*d*) are ON, levels above the lowest thresholds on the subbands centered at 1.5 kHz, 2.0 kHz and 4.0 kHz respectively activate logic 1s at envelope detectors 580*a*, 580*b* and 580*c*, each having time constants of 2 ms. Similarly, when dip switches 579*a*, 579*b* and 579*c* are OFF, levels above the middle thresholds on the subbands centered at 1.5, 2.0 and 4.0 kHz activate logic 1s at the outputs of envelope detectors 580*a*, 580*b*, and 580*c*.

The outputs of envelope detectors 580*a*, 580*b* and 580*c* are input to an NAND gate 582. The output of the AND gate 582 is also input to the variable threshold circuit 548 (FIG. 5*d*). A logic 1 from the AND gate 582 moves the variable threshold toward 2.75 V, while a logic 0 moves the variable threshold toward 0.5 V. The variable threshold voltage is compared with the subband voltage centered at 2.77 kHz at the detector 542*c* (FIG. 5*d*). The subband voltage of 100 mVRMS on the audio channel equals 2.8 Vpk at this point. When the subband voltage exceeds the variable threshold voltage, a monostable one shot 584, having a time constant of 2 ms, generates a logic 1 signal for providing a "NoGo" signal if the subband voltage exceeds the variable threshold voltage. An electronic switch 583 provides a connection between pin 1 (A) and pin 2 (B) if the signal on pin 13 (C) is a logic 1.

Figure 5H:
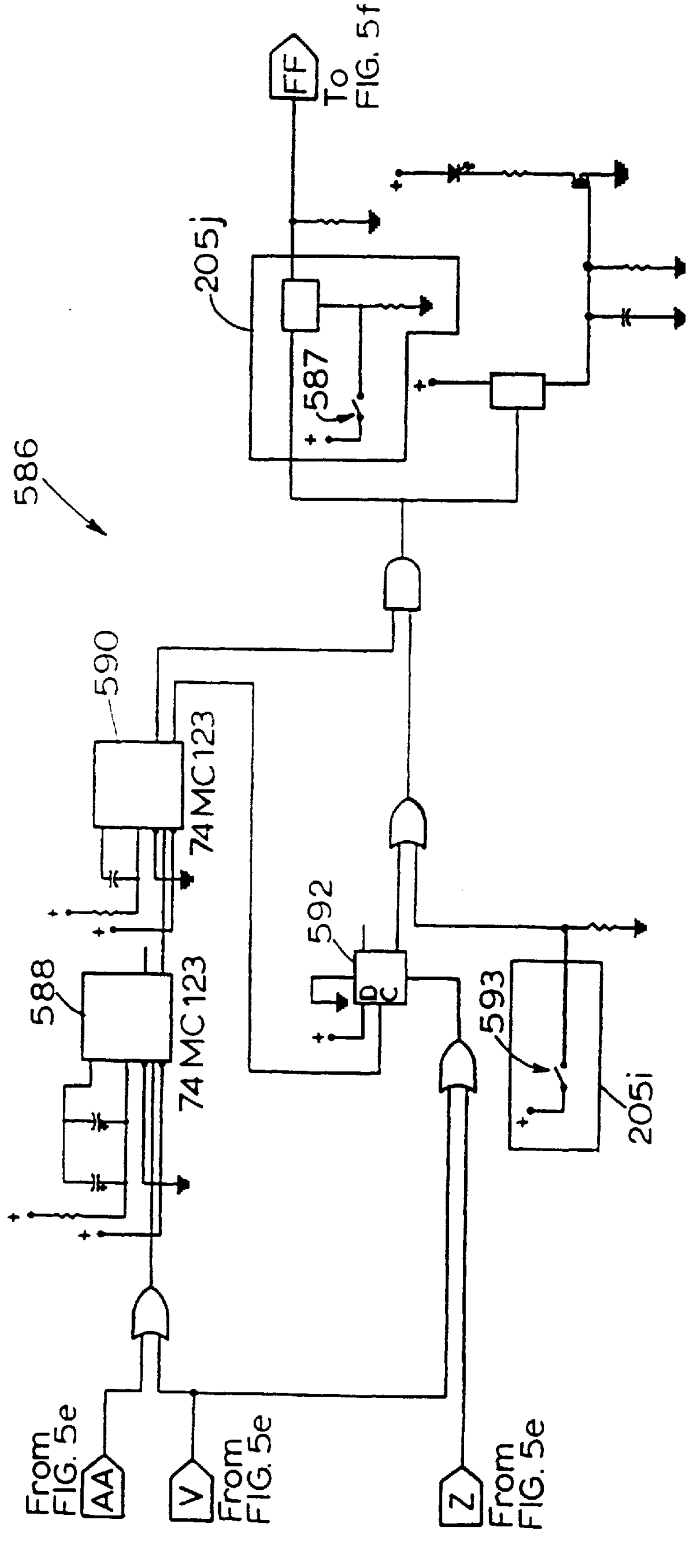

Referring to FIG. 5*h*, a five-second send circuit 586 is arranged to increase the likelihood of a transmission if no transmission has been made for five seconds. Placing a dip switch 587 ON activates this option. A timing circuit 588 sets a five second period responsive to any transmission. A timer circuit 590 generates a 1 ms pulse if no transmission has taken place during the five second period. A D flipflop 592 prohibits a five second transmission more than once before reset by a high or low transmission. An ON at a dip switch 593 inhibits this rule. A signal to activate a transmission is combined with the one second send circuit signal at the NAND gate 575*c* (FIG. 5*f*) and causes a high level transmission.

Referring to FIG. 2 and FIGS. 5*a*–5*h*, the switch circuits designated by reference numerals 205*a*–205*j* comprise part of the ROM 205 (FIG. 2) and set up the rules implemented by the neural network. Hence, the outputs of the switch circuits 205*a*–205*j* are electrically connected as inputs to the neural network 204 (FIG. 2).

In summary, the rules applied by the circuit of FIGS. 5*a*–5*h* are as follows: (1) any high level or low level surge permitting a transmission of an ancillary code must be longer than a predetermined minimum length; (2) a predetermined minimum amount of time must have passed since the last transmission; (3) no transmission is permitted within a predetermined amount of time following a laugh or clap; (4) a high level transmission is not permitted unless there has been a fade within a predetermined amount of time and to a level that is below a predetermined level; and (5) one transmission is permitted if no transmission has been made for five seconds between high and/or low transmissions.

The present invention may be used for program verification and/or for audience measurement. When used for program verification, a monitoring station is placed in a position to receive the signals from one or more radio and/or television stations and/or other transmitters. The monitoring station detects the ancillary codes embedded in the transmitted signals and uses these ancillary codes to directly or indirectly identify either the programs containing the ancillary codes, the sources of the broadcast signals, or both. This information is then reported back to interested parties who use the information to verify that the programs containing the ancillary codes were broadcasted or otherwise transmitted. For example, an advertiser may want to verify that its commercials were broadcast at the selected times and over the selected channels for which it paid. As another example, artists, whose royalties depend on the number of times their programs, songs, and the like are aired, may want to verify performance numbers in their royalty statements.

Figure 6:
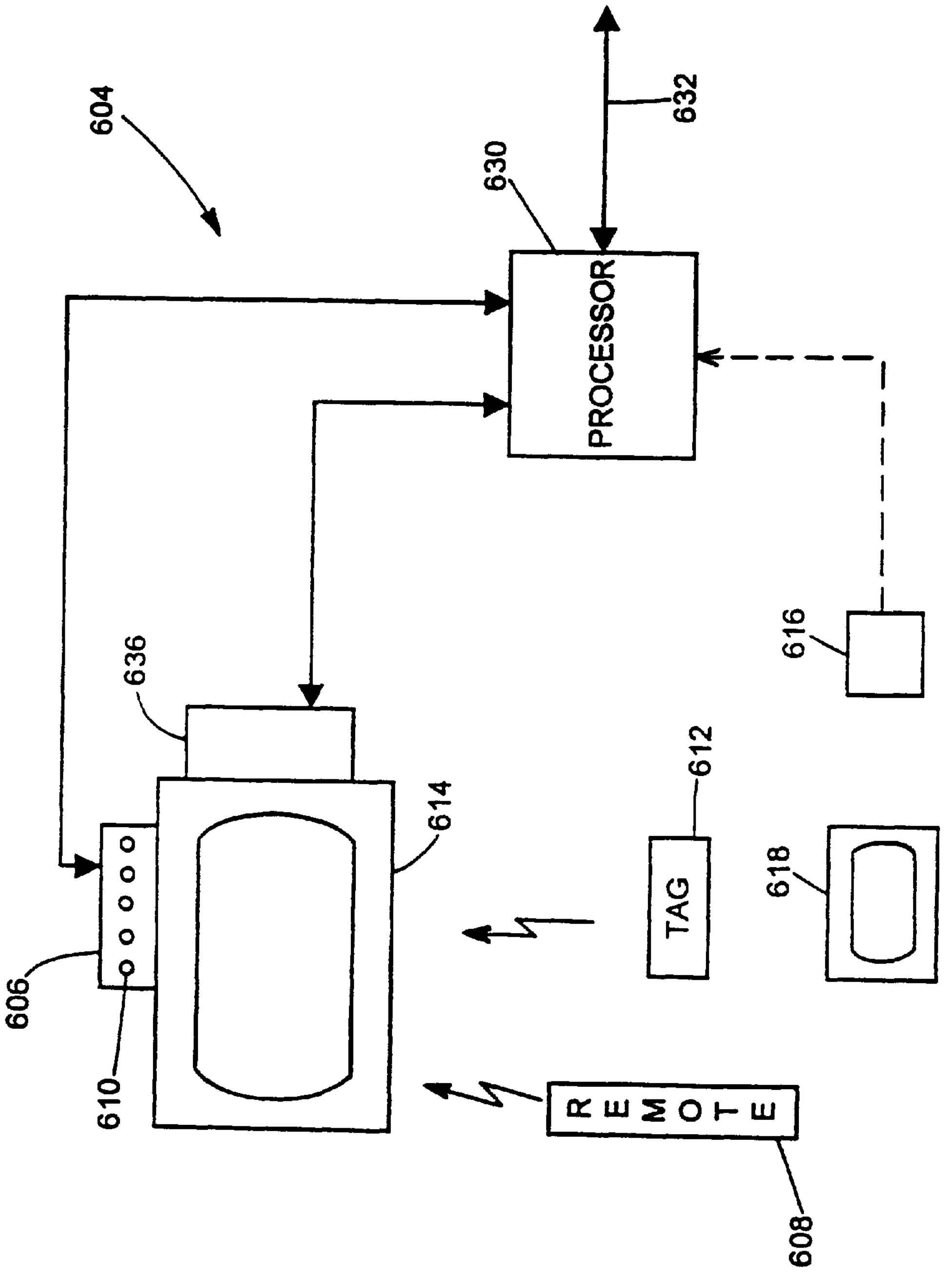
FIG. 6 is a schematic illustration of a household metering apparatus of a television audience measurement system according to the present invention.
Figure 7:
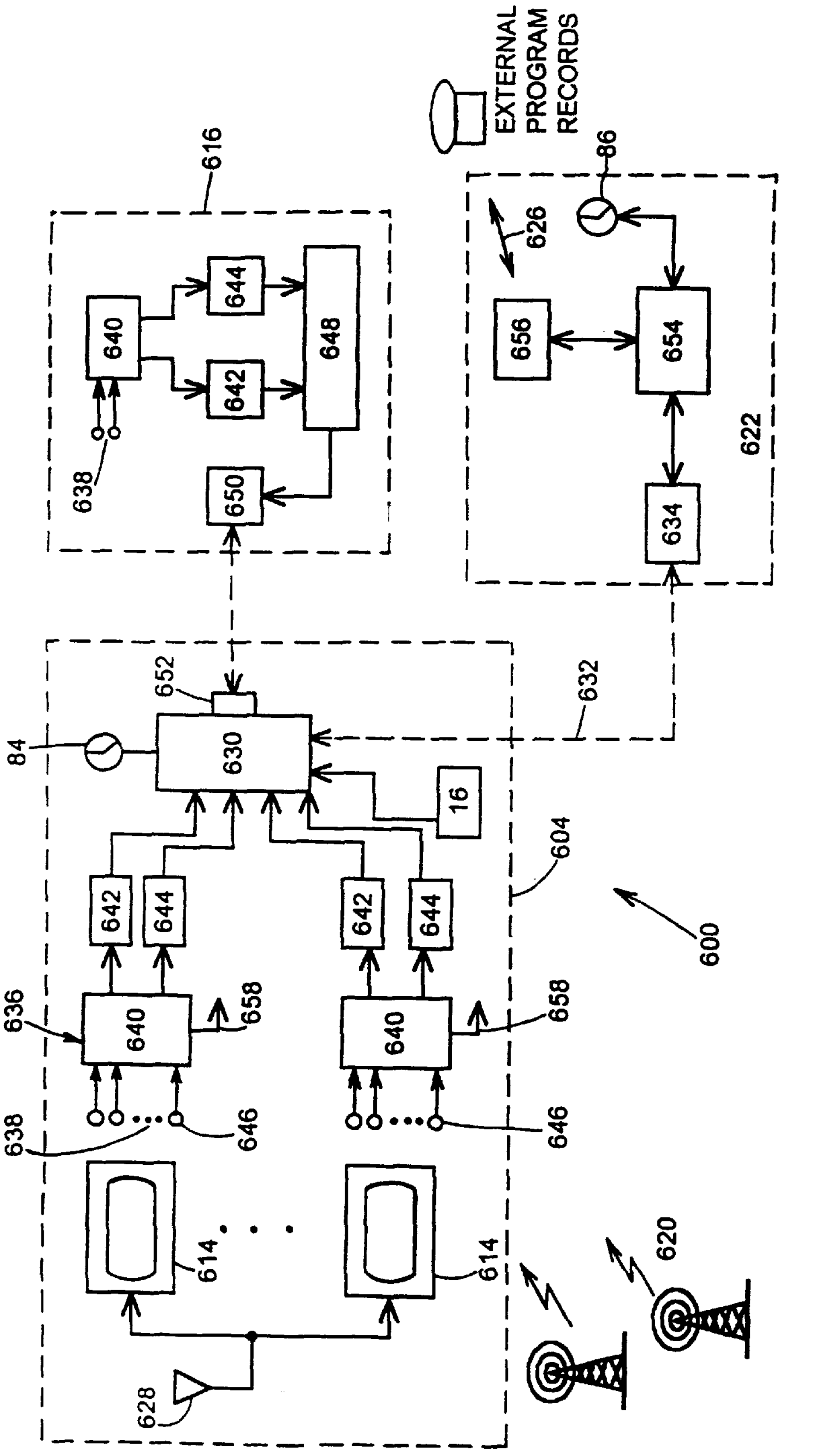
FIG. 7 is a block diagram of the television audience measurement system according to the present invention.

An audience measurement example of the present invention is shown in FIGS. 6 and 7. As shown in FIGS. 6 and 7, a television audience measurement system 600 (FIG. 7) measures the viewing habits of the members of a statistically selected household. The television audience measurement system 600 includes a household metering apparatus 604 located in the statistically selected household. The household metering apparatus 604 may include an audience composition dissemination device, which is referred to hereinafter as a "people meter." The people meter 606 allows audience members to indicate their presence by means of a remote control 608 and/or a plurality of pushbutton switches 610. Alternatively, or additionally, a personal tag 612 may be worn by a viewer and may periodically broadcast an identifying message to the people meter 606. Each viewer in the household may have a personal tag 612 that emits an identifying message exclusively identifying the viewer. Instead of, or in addition to, receiving information from the remote control 608, the pushbutton switches 610, and/or the personal tag 612, the people meter 606 may include an infrared camera and a computer image processing system (not shown) in order to passively identify the viewers in a viewing audience without requiring the active participants of the viewers to be identified. U.S. Pat. Nos. 4,858,000 and 5,031,228 and U.S. patent application Ser. No. 07/992,383, filed on Dec. 15, 1992, disclose examples of such a system. Accordingly, the people meter 606 identifies each viewing member of the viewing audience. It is desirable, but not essential, that the people meter 606 be located in the vicinity of a television, such as television 614, to be metered.

Although audience measurements are restricted to a determination of viewing activity at the television 614 within the household, it is clearly desirable to also measure viewing and tuning that may be done outside of the household. For this purpose, a portable metering apparatus 616 is provided. The portable metering apparatus 616 may be worn or carried by a viewer of the household when, for example, the viewer is away from the household, and may be referred to as a personal people meter. The portable metering apparatus 616 is capable of metering the programs or stations to which a television in the vicinity of the portable metering apparatus 616 is tuned. The portable metering apparatus 616 may also be used in conjunction with a portable television 618.

As shown in FIG. 7, the television audience measurement system 600 generally includes the household metering apparatus 604, which is installed in each of a plurality of statistically selected households and which receives signals from one or more program signal sources 620. The television audience measurement system 600 further includes a central office apparatus 622 that is installed at a central site and that collects data from the household metering apparatus 604 and from external program record sources as indicated by an arrow 626. The central office apparatus 622 processes the data collected from the household metering apparatus 604 and/or from the external program record sources to produce audience measurement reports.

Although FIG. 7 schematically depicts the program signal sources 620 as being broadcast transmission antennas that transmit program signals that are received by an antenna 628 in the statistically selected household, it will be understood that program signals can be distributed by a wide variety of means, such as by coaxial cables, fiber optic cables, satellites, rented video tapes, videodiscs, and/or the like. Moreover, although FIG. 7 shows television program signals being distributed to a plurality of television receivers 614 in a statistically selected household, it will become clear in the following discussion that the present invention is equally applicable to radio signals or to any other video and/or audio sources, such as tape cassettes, CDs and the like.

The household metering apparatus 604 of the television audience measurement system 600 preferably includes a data storage and telecommunication processor 630 that communicates, via a public switched telephone network 632, with a telecommunication processor 634 of the central office apparatus 622.

The household metering apparatus 604 also includes tuning measurement equipment 636 for each of the monitored televisions 614. Each tuning measurement equipment 636 includes one or more sensors 638, a signal preprocessing circuitry 640, a household code reader 642 and a household signature extractor 644. Any of a variety of sensors may be used for the sensors 638. For example, the sensors 638 may be, inter alia, a physical connection to the audio circuits of the metered television 614. The preferred sensor for the sensors 638, however, is a nonintrusive sensor, such as a microphone or a magnetic transducer. Microphones or the like, which can be installed in the immediate vicinity of the metered television 614 so as to pick up the sounds emanating from its speakers, offer an installation that is nonintrusive. Because the installation is nonintrusive, the metered television 614 need not be opened up in order to electrically connect the sensors 638 thereto. Objections that might otherwise be raised are thereby avoided.

Because microphones used as the sensors 638 will also pick up other sounds in the area, a second microphone 646 may be installed so that it picks up relatively more of the background noise and relatively less of the sounds from the speakers of the metered television 614. The output from the second microphone 646 is used by the signal preprocessing circuit 640 to at least partially delete background noise by the well known expedient of matching the amplitudes of the signals from the microphones 638 and 646, and then subtracting the signal produced by one of the microphones 638, 646 from the signal produced by the other of the microphones 638, 646. Alternatively, the signal preprocessing circuit 640 may employ input filters that can, for example, pass only those audio signals in a 300 Hz to 3000 Hz passband in order to eliminate traffic noise and to remove artifacts introduced by the response characteristics of the household's appliances and equipment. Another example of nonintrusive sensors that can be used for the sensors 638 includes inductive audio pickups operatively associated with the audio output circuitry of the metered televisions 614.

The sensors 638 are arranged to acquire at least portions of the program signals corresponding to the programs or stations that household members select for viewing on the televisions 614. These portions of the program signals acquired by the sensors 638 are preprocessed, as desired, by the preprocessing circuit 640. The signal preprocessing circuit 640 supplies preprocessed program signals both to the household code reader 642, which attempts to locate and read ancillary codes from the program signals corresponding to the programs or stations selected by one or more viewers in the statistically selected household, and to the household signature extractor 644, which generates program signatures from the program signals selected by the one or more viewers whenever the household code reader 642 fails to find an ancillary code.

The household code reader 642 may be of the type similar to that disclosed with reference to FIG. 3 above. The ancillary code may have any form, so long as the program and/or station associated therewith is uniquely identified by the code. Also, as taught by Thomas et al. in U.S. Pat. No. 5,425,100, the ancillary code may comprise a plurality of segments each containing unique source information so that the information in each segment is representative of a selected one of a plurality of levels of distribution of the associated program.

Because an ancillary code can carry with it all of the information necessary for identifying a broadcast transmission, and since code readers are well known, and audience measurement system that uses encoded program transmission is economically very attractive. Moreover, code readers for reading ancillary odes can be provided with appropriate checking algorithms and the like so that the number of failures to accurately read the ancillary code (such as the multilevel code described by Thomas et al. in U.S. Pat. No. 5,425,100) can be made arbitrarily low.

The problem with a system that relies exclusively on ancillary codes is that not all program or stations are provided with useable ancillary codes. Thus, it is advantageous to also include a signature extractor to extract signatures from the program signals. Such signatures may be used when ancillary codes are not included in the program being viewed. Accordingly, the household signature extractor 644 is also included in the household metering apparatus 604 in addition to the household code reader 642 so that signatures can be collected from the received program signals from which a code cannot be read. These signatures are unique to the program signals from which they are extracted and, thus, may be used to identify the programs or stations being viewed. The household signature extractor 644 may be of the type disclosed in U.S. Pat. No. 4,697,209 by Kiewit et al., the disclosure if which is incorporated herein by reference.

The data storage and telecommunication processor 630 selectively stores the ancillary codes that have been read by the household code reader 642 and/or the signatures extracted by the household signature extractor 644. It should be noted that in the event that a partially legible ancillary code is read by the household code reader 642, the data storage and telecommunication processor 630 may also store the ancillary code fragment (e.g., one segment or partial segment of a multilevel code) for use by the television audience measurement system 600.

If the portable metering apparatus 616, which may be similar to the household metering apparatus 604 and which may also have one or more sensors 638, is used in or out of a given statistically selected household, the data that it generates are temporarily stored in a random access memory 648 so that it may be occasionally transferred to the data storage and telecommunication processor 630 by way of an interface circuit 650, such as a first modem, in the portable metering apparatus 616, and a corresponding interface circuit 652, such as a second modem, associated with the data storage and telecommunication processor 630. As is known in the art, data may be transmitted between the interface circuits 650 and 652 by direct electrical connections, radio frequency transmissions, pulsed infrared signaling, or the like. The portable metering apparatus 616 also includes a signal preprocessing circuit 640, a code reader 642 and a signature extractor 644.

If the program or stations being viewed cannot be identified from ancillary codes, either because ancillary signals are not present or are not legible, the program signatures extracted by the household signature extractors 644 of the household metering apparatus 604 can be compared to reference signatures that have been previously extracted either by the household metering apparatus 604, by the central office apparatus 622, or by reference signature extraction apparatus located at one or more local reference signature extraction sites. This comparison of program signatures to reference signatures may be performed either at the household metering apparatus 604, at the central office apparatus 622 or at a reference signature extraction site, and the results of this comparison are used to identify the programs or stations being viewed.

Moreover, the apparatus that extracts reference signatures may include a program replication apparatus for each received channel, as taught in U.S. Pat. No. 4,677,466. The program replication apparatus creates a replica of the monitored program and stores that replica in a memory so that the replica can be subsequently retrieved by a central office computer 654 of the central office apparatus 622. Thus, a human operator can view the program on a multimedia terminal 656 for the purpose of identifying nonencoded programs. The multimedia terminal 656 may include a video display and a speaker. Although the program replication apparatus may be a VCR system as taught in U.S. Pat. No. 4,677,466, the program replication apparatus is preferably a signal compression apparatus that creates a digital replica of the monitored program. Accordingly, the digital replica may be transmitted electronically, if necessary, by way of the public switched telephone network 632, so that the compressed data can be used to regenerate a facsimile of at least portions of the nonencoded programs. A human operator can view the facsimile on the terminal 656 for the purpose of identifying the nonencoded programs.

A variety of compression methods known to the art may be used to generate digital replicas of the monitored programs or stations. Video signals may be compressed, for example, in accordance with the methods described by W. R. Zettler et al. in a report entitled "Application of Compactly Supported Wavelets to Image Compression." Audio signals maybe compressed in accordance with the methods described by J. P. Stautner in a paper presented at the 93rd Convention of the Audio Engineering Society (Oct. 1–4, 1992). However, any other suitable compression technique may alternatively be used.

Alternatively, the household signature extractors 644 may instead be household channel and/or station detectors in order to identify selected channels and/or stations. Thus, the selections of channels and/or stations by the members of the household may be used when ancillary codes are not included in the programs being viewed. Accordingly, the household channel and/or station detector may also be included in the household metering apparatus 604 in addition to the household ancillary code reader 642 so that the selections of channels and/or stations by the members of the household can be determined and collected when ancillary codes cannot be read.

When a household channel and/or station detector is used in place of a household signature extractor 644, and when a member of the household takes a control action by use of the remote control 608, the signals emanating from the remote control 608 are received by both the television receiver 614 and appropriate ones of the sensors 638 of the tuning measurement equipment 636. Therefore, if the household ancillary code reader 642 is unable to locate and/or read valid ancillary codes from the program signals corresponding to the programs or stations selected by one or more members in the household, channels and/or stations detected by the household channel and/or station detector 644 may be used instead to provide the information relating to the viewing habits of the members of the household.

Additionally, or alternatively, if the household ancillary code reader 642 is unable to locate and/or read valid ancillary codes from the program signals corresponding to the programs or stations selected by one or more members in the household, the tuning measurement equipment 636 may be arranged to prompt such members to enter the selected channel and/or station by use of an input device, such as the remote control 608, the pushbutton switches 610 of the people meter 606, a voice recognition sensor, and so on. The prompt may be provided by the television receiver 614 through the use of an on-screen information or by a transducer or display 658. The transducer or display 658 may be of the type that provides an audio signal, a synthesize voice message from a speaker, a visual display, or a flash from an LED, a CRT or an LCD, or the like. The response to the prompt may be received by an appropriate one of the sensors 638 or by the additional microphone 646 and is stored for eventual transmission to the central office apparatus 622.

It is understood that the present invention can take many forms and embodiments. The embodiments shown herein are intended to illustrate rather than to limit the invention, it being appreciated that variations may be made without departing from the spirit of the scope of the invention. For example, the encoder 200 may comprise fewer than all of the transmission encoders 220–224, especially if it is known prior to transmission of the ancillary code that the ancillary code will or will not withstand lossy compression. In addition, the functions of any of the transmission encoders 220, 222, 224, as well as those of the receiver sync circuit 312, and the decoder circuit 33 of the FSK decoder 314 may be performed by digital signal processors, if desired. Moreover, the broadcast or transmission as used herein is intended to mean any conveyance of a signal between two or more points, such as between two broadcast stations, between two cable stations, between a broadcast or cable station and a residential commercial or industrial establishment, between a VCR or other tape, cassette, cartridge, disc player, computer, or solid state player and a receiver or other display, whether over the air, by way of cable, by way of a satellite link, or by way of other conducting media, and/or the like.

Although illustrative embodiments of the invention have been shown and described, a wide range of modification, change and substitution is intended in the foregoing disclosure and in some instances some features of the present invention may be employed without a corresponding use of the other features. Moreover, as used in the claims, audio signal sources may include television programs, radio programs, radio and/or television channels, songs, CDs, laser video disks, tapes, computers, computer programs, interactive programs, games, program originators, networks, local stations, syndicators, cable companies, and/or the like. Furthermore, the present invention may be used in signal injection systems for determining the channels to which tuners are tuned. Accordingly, it is appropriate that the appended claims be construed broadly and in a manner consistent with the scope of the invention.

What is claimed is:

1. A system for monitoring the broadcast of a composite signal comprising an ancillary code added to an audio signal generated by an audio signal source, said ancillary code being added to said audio signal on occurrence of an opportunity for adding said ancillary code within a perceptual entropy envelope of said audio signal, said ancillary code comprising an identifying ancillary code associated with said audio signal source, the system comprising composite signal receiving means for receiving said transmitted composite signal, detecting means for detecting said identifying ancillary code from said audio signal and for interpreting at least one fuzzy logic signal corresponding to said composite signal when said composite signal is compressed, storing means for storing in a memory said identifying ancillary code and communicating means for communicating said stored identifying ancillary code to a remote central office.

2. The system of claim 1 further comprising a clock having an output, and wherein said storing means stores in said memory said clock output representative of a time at which said identifying auxiliary code was detected.

3. The system of claim 1 wherein said system monitors a monitored receiver and wherein said identifying auxiliary code is an FSK modulated auxiliary code.

4. The system of claim 1 wherein said system monitors a monitored receiver and wherein said monitored receiver is disposed within a household.

5. The system of claim 1 further comprising a plurality of audio signal sources and a plurality of ancillary codes, each of said ancillary codes being uniquely associated with one of said audio signal sources.

6. The system of claim 1 wherein said identifying auxiliary code is a spread spectrum auxiliary code.

7. The system of claim 1 wherein said composite signal receiving means, said detecting means, and said storing means are disposed within a dedicated area.

8. The system of claim 1 further comprising means for determining the audio signal source if said ancillary code cannot be detected.

9. A method of monitoring a transmission of a composite signal comprising an audio signal generated at an audio signal source and an identifying ancillary code added to said audio signal within a perceptual entropy envelope thereof, said identifying ancillary code being associated with said audio signal source, wherein said composite signal is transmitted from a transmitting location, the method comprising:

receiving said transmitted composite signal at a monitoring location;

detecting, at said monitoring location, said identifying ancillary code from said composite signal by interpreting at least one fuzzy logic signal corresponding to said composite signal when said composite signal is compressed, and storing said detected identifying ancillary code in a memory; and communicating said stored identifying ancillary code to a central computer.

10. The method of claim 9 wherein said identifying ancillary code is an FSK modulated ancillary code.

11. The method of claim 9 wherein said monitoring location is disposed within a household.

12. The method of claim 9 wherein said composite signal comprises a television audio signal.

13. The method of claim 9 further comprising a plurality of audio signal sources and a plurality of ancillary codes, each of said ancillary codes uniquely associated with one of said audio signal sources.

14. The method of claim 9 wherein a time data representative of said time at which said identifying ancillary code is detected from said composite signal thereof is stored associated with said identifying ancillary code and stored in said memory.

15. The method of claim 9 wherein said composite signal comprises a radio audio signal.

16. The method of claim 9 wherein said identifying ancillary code is a spread spectrum ancillary code.

17. The method of claim 9 wherein said monitoring location is disposed within a dedicated area.

18. The method of claim 9 further comprising the step of determining the audio signal source if said identifying ancillary code cannot be detected.

19. A system for combining an ancillary code and a program audio signal to form a composite audio signal, wherein said program audio signal is generated by a program audio signal source, wherein said ancillary code identifies a broadcast program to be received by an audience, said system comprising:

audio signal monitoring means for monitoring said program audio signal and for generating a control signal on occurrences of opportunities for adding said ancillary code within a perceptual entropy envelope of said program audio signal; and inserting means for inserting said ancillary code into said program audio signal, responsive to said control signal, so that said ancillary code is inserted within said perceptual entropy envelope of said program audio signal, thereby forming said composite signal;

wherein said audio signal monitoring means applies a set of rules in detecting said occurrences of opportunities comprising (1) any surge permitting a transmission of an ancillary code is longer than a predetermined minimum, (2) a predetermined minimum amount of time has elapsed since the last transmission, and (3) a transmission is not permitted unless there has been a fade within a predetermined amount of time and to a level that is below a predetermined level.

20. The system of claim 19 wherein said rules further include (4) no transmission is permitted within a predetermined amount of time following a laugh or clap, and (5) one transmission is permitted if no transmission has been made for five seconds between high and low transmissions.

21. The system of claim 19 further comprising detecting means for detecting said ancillary code in order to measure an audience to a program encoded with said ancillary code.

22. The system of claim 19 further comprising detecting means for detecting said ancillary code in order to verify a broadcast of a program encoded with said ancillary code.

23. The system of claim 19 wherein said ancillary code is an FSK modulated ancillary code.

24. The system of claim 19 wherein said ancillary code is a spread spectrum ancillary code.

25. The system of claim 19 further comprising means for determining the program audio signal source if said ancillary code cannot be detected.

* * * * *